United States Patent
Vakili

(10) Patent No.: US 11,240,013 B1
(45) Date of Patent: *Feb. 1, 2022

(54) SYSTEMS AND METHODS FOR PASSIVE QUANTUM SESSION AUTHENTICATION

(71) Applicant: Wells Fargo Bank, N.A., San Francisco, CA (US)

(72) Inventor: Masoud Vakili, Los Altos, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 574 days.

This patent is subject to a terminal disclaimer.

(21) Appl. No.: 16/105,100

(22) Filed: Aug. 20, 2018

(51) Int. Cl.
*H04L 9/08* (2006.01)

(52) U.S. Cl.
CPC .......... *H04L 9/0852* (2013.01); *H04L 9/0869* (2013.01)

(58) Field of Classification Search
CPC ..... H04L 9/0844; H04L 9/0869; H04L 63/08; H04L 9/0858
See application file for complete search history.

(56) References Cited

U.S. PATENT DOCUMENTS

| | | | |
|---|---|---|---|
| 5,515,438 A | 5/1996 | Bennett et al. | |
| 6,289,104 B1 * | 9/2001 | Patterson | H04L 9/0858 380/256 |
| 6,748,083 B2 | 6/2004 | Hughes et al. | |
| 7,324,647 B1 | 1/2008 | Elliott | |
| 7,333,611 B1 | 2/2008 | Yuen et al. | |
| 7,457,416 B1 * | 11/2008 | Elliott | H04L 9/0852 380/256 |
| 7,460,669 B2 | 12/2008 | Foden et al. | |
| 7,649,996 B2 * | 1/2010 | Nishioka | H04B 10/70 380/255 |
| 7,697,693 B1 * | 4/2010 | Elliott | H04B 10/70 380/278 |
| 7,787,628 B2 | 8/2010 | Kuang et al. | |
| 8,332,730 B2 | 12/2012 | Harrison et al. | |
| 8,683,192 B2 * | 3/2014 | Ayling | H04L 9/0858 713/153 |
| 8,693,691 B2 | 4/2014 | Jacobs | |

(Continued)

FOREIGN PATENT DOCUMENTS

| | | |
|---|---|---|
| CN | 107040378 A | 8/2017 |
| WO | 2017/108539 A1 | 6/2017 |

OTHER PUBLICATIONS

Kartheek et al., Security in Quantum Computing Using Quantum Key Distribution Protocols, 2013, IEEE, pp. 19-25. (Year: 2013).*

(Continued)

*Primary Examiner* — Samson B Lemma
*Assistant Examiner* — Abdullah Almamun
(74) *Attorney, Agent, or Firm* — Alston & Bird LLP

(57) ABSTRACT

Systems, apparatuses, methods, and computer program products are disclosed for session authentication. An example method includes determining, by decoding circuitry, a set of quantum bases to use for measurement. The example method further includes receiving, by the decoding circuitry, a series of photons. The example method further includes decoding, by the decoding circuitry and based on the determined set of quantum bases, the series of photons to generate a decoded set of bits. The example method further includes generating, by session authentication circuitry, a session key based on the decoded set of bits.

19 Claims, 13 Drawing Sheets

(56) References Cited

U.S. PATENT DOCUMENTS

| | | | |
|---|---|---|---|
| 8,755,525 B2 | 6/2014 | Wiseman | |
| 8,855,316 B2 | 10/2014 | Wiseman et al. | |
| 9,036,817 B1 | 5/2015 | Hunt et al. | |
| 9,083,684 B2 | 7/2015 | Tanizawa et al. | |
| 9,184,912 B2 | 11/2015 | Harrington | |
| 9,191,198 B2 | 11/2015 | Harrison et al. | |
| 9,680,640 B2 | 6/2017 | Hughes et al. | |
| 9,692,595 B2 | 6/2017 | Lowans et al. | |
| 10,439,806 B2 | 10/2019 | Fu et al. | |
| 10,540,146 B1 | 1/2020 | Vakili | |
| 10,587,402 B2 | 3/2020 | Nordholt et al. | |
| 2002/0106084 A1* | 8/2002 | Azuma | B82Y 10/00 380/263 |
| 2003/0002674 A1* | 1/2003 | Nambu | H04L 9/0852 380/256 |
| 2004/0109564 A1 | 6/2004 | Cerf et al. | |
| 2004/0238813 A1 | 12/2004 | Lidar et al. | |
| 2005/0036624 A1 | 2/2005 | Kent et al. | |
| 2005/0157875 A1* | 7/2005 | Nishioka | H04B 10/70 380/46 |
| 2005/0249352 A1 | 11/2005 | Choi et al. | |
| 2006/0056630 A1 | 3/2006 | Zimmer et al. | |
| 2006/0088157 A1* | 4/2006 | Fujii | H04L 9/3006 380/30 |
| 2006/0263096 A1 | 11/2006 | Dinu et al. | |
| 2007/0110242 A1* | 5/2007 | Tomita | H04L 9/0858 380/255 |
| 2007/0260658 A1 | 11/2007 | Fiorentino et al. | |
| 2008/0076525 A1 | 3/2008 | Kim | |
| 2009/0169015 A1 | 7/2009 | Watanabe | |
| 2009/0180615 A1 | 7/2009 | Trifonov | |
| 2011/0126011 A1 | 5/2011 | Choi et al. | |
| 2011/0142242 A1* | 6/2011 | Tanaka | H04L 9/0858 380/282 |
| 2011/0173696 A1 | 7/2011 | Dynes et al. | |
| 2011/0213979 A1 | 9/2011 | Wiseman et al. | |
| 2011/0280405 A1* | 11/2011 | Habif | H04L 9/0858 380/278 |
| 2013/0083926 A1 | 4/2013 | Hughes et al. | |
| 2013/0101119 A1 | 4/2013 | Nordholt et al. | |
| 2013/0101121 A1 | 4/2013 | Nordholt et al. | |
| 2013/0163759 A1 | 6/2013 | Harrison et al. | |
| 2013/0251145 A1 | 9/2013 | Lowans et al. | |
| 2013/0315395 A1* | 11/2013 | Jacobs | H04L 9/0852 380/278 |
| 2015/0188701 A1 | 7/2015 | Nordholt et al. | |
| 2015/0222619 A1 | 8/2015 | Hughes et al. | |
| 2015/0312035 A1 | 10/2015 | Choi | |
| 2016/0028542 A1 | 1/2016 | Choi et al. | |
| 2016/0191173 A1 | 6/2016 | Malaney | |
| 2016/0248582 A1 | 8/2016 | Ashrafi et al. | |
| 2016/0248586 A1 | 8/2016 | Hughes et al. | |
| 2016/0328211 A1 | 11/2016 | Nordholt et al. | |
| 2016/0352515 A1 | 12/2016 | Bunandar et al. | |
| 2017/0033926 A1* | 2/2017 | Fu | H04L 9/0852 |
| 2017/0126654 A1* | 5/2017 | Fu | H04L 63/083 |
| 2017/0214525 A1 | 7/2017 | Zhao et al. | |
| 2017/0222731 A1 | 8/2017 | Lucamarini et al. | |
| 2017/0324551 A1 | 11/2017 | Ahn | |
| 2017/0324552 A1 | 11/2017 | Ahn | |
| 2017/0331623 A1* | 11/2017 | Fu | G06F 21/602 |
| 2017/0338951 A1* | 11/2017 | Fu | H04L 9/0852 |
| 2017/0338952 A1* | 11/2017 | Hong | H04L 9/0858 |
| 2018/0069698 A1* | 3/2018 | Hong | H04L 9/0869 |
| 2018/0131510 A1 | 5/2018 | Hassan | |
| 2018/0198608 A1 | 7/2018 | Nordholt et al. | |
| 2018/0269989 A1 | 9/2018 | Murakami et al. | |
| 2019/0007215 A1 | 1/2019 | Hakuta et al. | |
| 2019/0020469 A1 | 1/2019 | Dottax et al. | |
| 2019/0129694 A1 | 5/2019 | Benton et al. | |
| 2019/0149327 A1* | 5/2019 | Yuan | H04L 9/0855 380/255 |
| 2019/0190706 A1* | 6/2019 | Stack | G01J 1/0429 |
| 2019/0238326 A1 | 8/2019 | Ji et al. | |
| 2019/0243611 A1 | 8/2019 | Martin et al. | |
| 2019/0268146 A1 | 8/2019 | Samid | |
| 2019/0289006 A1 | 9/2019 | Fang et al. | |
| 2020/0153619 A1 | 5/2020 | Ribordy | |

OTHER PUBLICATIONS

Armanuzzaman, Md. et al. A Secure and Efficient Data Transmission Technique Using Quantum Key Distribution. 2017 4th International Conference on Networking, Systems and Security (NSysS). https://ieeexplore.ieee.org/stamp/stamp.jsp?tp=&arnumber=8267797 (Year: 2017).

Liu, Zhihao et al. Mutually Authenticated Quantum Key Distribution Based on Entanglement Swapping. 2009 Pacific-Asia Conference on Circuits, Communications and Systems. https://ieeexplore.ieee.org/stamp/stamp.jsp?tp=&arnumber=5232366 (Year:2009).

Ronczka, John. Backchanneling Quantum Bit (Qubit) Shuffling 1: Quantum Bit (Qubit) 'Shuffling' as Added Security by Slipstreaming Q-Morse. 2016 3rd Asia-Pacific World Congress on Computer Science and Engineering (APWC on CSE). https://ieeexplore.ieee.org/stamp/stamp.jsp?tp=&arnumber=7941948 (Year: 2016).

Garcia-Escartin, Juan Carlos; Chamorro-Posada, Pedro. Hidden Probe Attacks on Ultralong Fiber Laser Key Distribution Systems. IEEE Journal of Selected Topics in Quantum Electronics (vol. 24, Issue: 3, May-Jun. 2018). https://ieeexplore.ieee.org/stamp/stamp.jsp?tp=&arnumber=8219358 (Year: 2018).

Imany, Poolad et al. Demonstration of frequency-bin entanglement in an integrated optical microresonator. 2017 Conference on Lasers and Electro-Optics (CLEO). https://ieeexplore.ieee.org/stamp/stamp.jsp?tp=&arnumber=8083593 (Year: 2017).

Price, Alasdair B. et al. High-Speed Quantum Key Distribution with Wavelength-Division Multiplexing on Integrated Photonic Devices. 2018 Conference on Lasers and Electro-Optics (CLEO). https://ieeexplore.ieee.org/stamp/stamp.jsp?tp=&arnumber=8426886 (Year: 2018).

Charjan, S et al., "Quantum Key Distribution by Exploitation Public Key Cryptography (ECC) in Resource Constrained Devices," International Journal of Emerging Engineering Research and Technology, 3(7): 5-12, (2015).

Non-Final Rejection for U.S. Appl. No. 15/916,763, dated Oct. 30, 2019.

Non-Final Rejection for U.S. Appl. No. 16/105,294, dated Nov. 12, 2019.

Non-Final Rejection for U.S. Appl. No. 16/105,370, dated Nov. 8, 2019.

Pandya, M., "Securing Clouds—The Quantum Way," arXiv preprint arXiv:1512.02196, 16 pages, (2015).

Non-Final Office Action dated Jan. 16, 2020 for U.S. Appl. No. 16/712,338.

Bienfang, J.C. et al. Quantum generated one-time-pad encryption with 1.25 Gbps clock synchronization. 2005 OFC/NFOEC Technical Digest. Optical Fiber Communication Conference. https://ieeexplore.ieee.org/stamp/stamp.jsp?tp=&arnumber=1501276 (Year: 2005).

Chen, Wei et al. Field Experiment on a "Star Type" Metropolitan Quantum Key Distribution Network. IEEE Photonics Technology Letters, vol. 21, Issue: 9. https://ieeexplore.ieee.org/stamp/stamp.isp?tp=&arnumber=4787043 (Year: 2009).

Elboukhari, Mohamed et al. Implementation of secure key distribution based on quantum cryptography. 2009 International Conference on Multimedia Computing and Systems. https://ieeexplore.ieee.org/stamp/stamp.jsp?tp=&arnumber=5256673 (Year:2009).

Thangavel, T. S.; Krishnan, A. Performance of integrated quantum and classical cryptographic model for password authentication, https://ieeexplore.ieee.org/stamp/stamp jsp?tp=&arnumber=5591718 (Year: 2010).

Sirdhar, S. et al., Intelligent Security Framework for IoT Devices Cryptography based End-To-End security Architecture, International Conference on Inventive Systems and Control (ICISC-2017) 1-5.

(56) References Cited

OTHER PUBLICATIONS

Mohammad, Omer K. et al., Statistical Analysis for Random Bits Generation on Quantum Key Distribution, Cyber Warfare and Digital Forensic (CyberSec), 2014 Third International Conference (2014) 45-51.

Liu, D. et al., A Communication Model in Multilevel Security Network Using Quantum Key, Chinese Automation Congress (CAC) (2015) 915-918.

Hong, K. W. et al., Challenges in Quantum Key Distribution: A Review, ACM Proceeding (2016) 29-33.

Debuisschert, T. et al., Strenghtening Classical Symmetric Encryption with Continuous Variable Quantum Key Distribution, CLEO Technical Digest, OSA (2012), 2 pages.

Abubakar, M. Y. et al., Two Channel Quantum Security Modelling Focusing on Quantum Key Distribution Technique, IT Convergence and Security (ICITCS), 2015 5th International Conference (2015) 5 pages.

\* cited by examiner

SYSTEMS AND METHODS FOR PASSIVE QUANTUM SESSION AUTHENTICATION

TECHNOLOGICAL FIELD

Example embodiments of the present disclosure relate generally to session authentication and, more particularly, to systems and methods for quantum session authentication.

BACKGROUND

Session authentication may describe various techniques for securing electronic communications between two computing devices, such as a server device and a client device, using a unique session key (e.g., a session identifier (ID)). Selecting a session key that cannot be guessed is thus an important element of preventing attacks whereby a perpetrator derives the session key and then uses it to intercept communications by tapping into the communication path between the server device and the client device. This security concern is amplified in high volume session authentication systems designed to authenticate multiple sessions between multiple computing devices, such as multiple server devices and multiple client devices, at any given time.

Generating session IDs to be used in session authentication often relies upon the use of pseudo-random number generation. While often referred to as "random number generation," in truth it has historically been difficult to generate truly random numbers, and tools for "random" number generation have usually employed procedures whose outputs can be reproduced if certain underlying inputs are known. And while historically such pseudo-random number generation has been sufficient to generate session IDs that prevent malicious access, methods relying upon pseudo-random number generation are becoming increasingly susceptible to attack as the availability of computing power has increased. If a perpetrator has access to a user's device or information related to a user's session such as the user's access time, there are now often sufficient computing resources for a malicious attacker to perform a brute force attack exploiting the patterns inherent in traditional pseudo-random number generation techniques. In this way, a user's session may be compromised by an attacker who is able to replicate the user's session key. As alluded to above, this vulnerability has emerged by virtue of the new technical problems posed by the growing computing resources available today, because perpetrators have a greater ability to determine the method by which a session key is pseudo-randomly generated, replicate the method to generate the same session key, and then break into a user's session.

BRIEF SUMMARY

Systems, apparatuses, methods, and computer program products are disclosed herein for improved session authentication. The session authentication system provided herein solves the above problems by generating and transmitting photons and, subsequently, receiving and decoding those photons using a determined set of quantum bases in order to inject true randomness into the process for generating session keys or seeds for a pseudorandom number generation process used to establish secure sessions at multiple session authentication system server devices.

In one example embodiment, a system is provided for session authentication. The system may comprise decoding circuitry configured to determine a set of quantum bases to use for measurement. The decoding circuitry may be further configured to receive a series of photons and decode, based on the determined set of quantum bases, the series of photons to generate a decoded set of bits. The system may further comprise session authentication circuitry configured to generate a session key based on the decoded set of bits.

In another example embodiment, an apparatus is provided for session authentication. The apparatus may comprise decoding circuitry configured to determine a set of quantum bases to use for measurement. The decoding circuitry may be further configured to receive a series of photons and decode, based on the determined set of quantum bases, the series of photons to generate a decoded set of bits. The apparatus may further comprise session authentication circuitry configured to generate a session key based on the decoded set of bits.

In another example embodiment, a method is provided for session authentication. The method may comprise determining, by decoding circuitry, a set of quantum bases to use for measurement. The method may further comprise receiving, by the decoding circuitry, a series of photons. The method may further comprise decoding, by the decoding circuitry and based on the determined set of quantum bases, the series of photons to generate a decoded set of bits. The method may further comprise generating, by session authentication circuitry, a session key based on the decoded set of bits.

In another example embodiment, a computer program product is provided for session authentication. The computer program product comprises at least one non-transitory computer-readable storage medium storing program instructions that, when executed, may cause an apparatus to determine a set of quantum bases to use for measurement. The program instructions, when executed, may further cause the apparatus to receive a series of photons. The program instructions, when executed, may further cause the apparatus to decode, based on the determined set of quantum bases, the series of photons to generate a decoded set of bits. The program instructions, when executed, may further cause the apparatus to generate a session key based on the decoded set of bits.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE DRAWINGS

The accompanying drawings, which are not necessarily drawn to scale, illustrate embodiments and features of the present disclosure. Together with the specification, including the brief summary above and the detailed description below, the accompanying drawings serve to explain the embodiments and features of the present disclosure. The components illustrated in the drawings represent components that may or may not be present in various embodiments or features of the disclosure described herein. Accordingly, some embodiments or features of the present disclosure may include fewer or more components than those shown in the drawings while not departing from the scope of the disclosure.

DETAILED DESCRIPTION

Figure 1A:
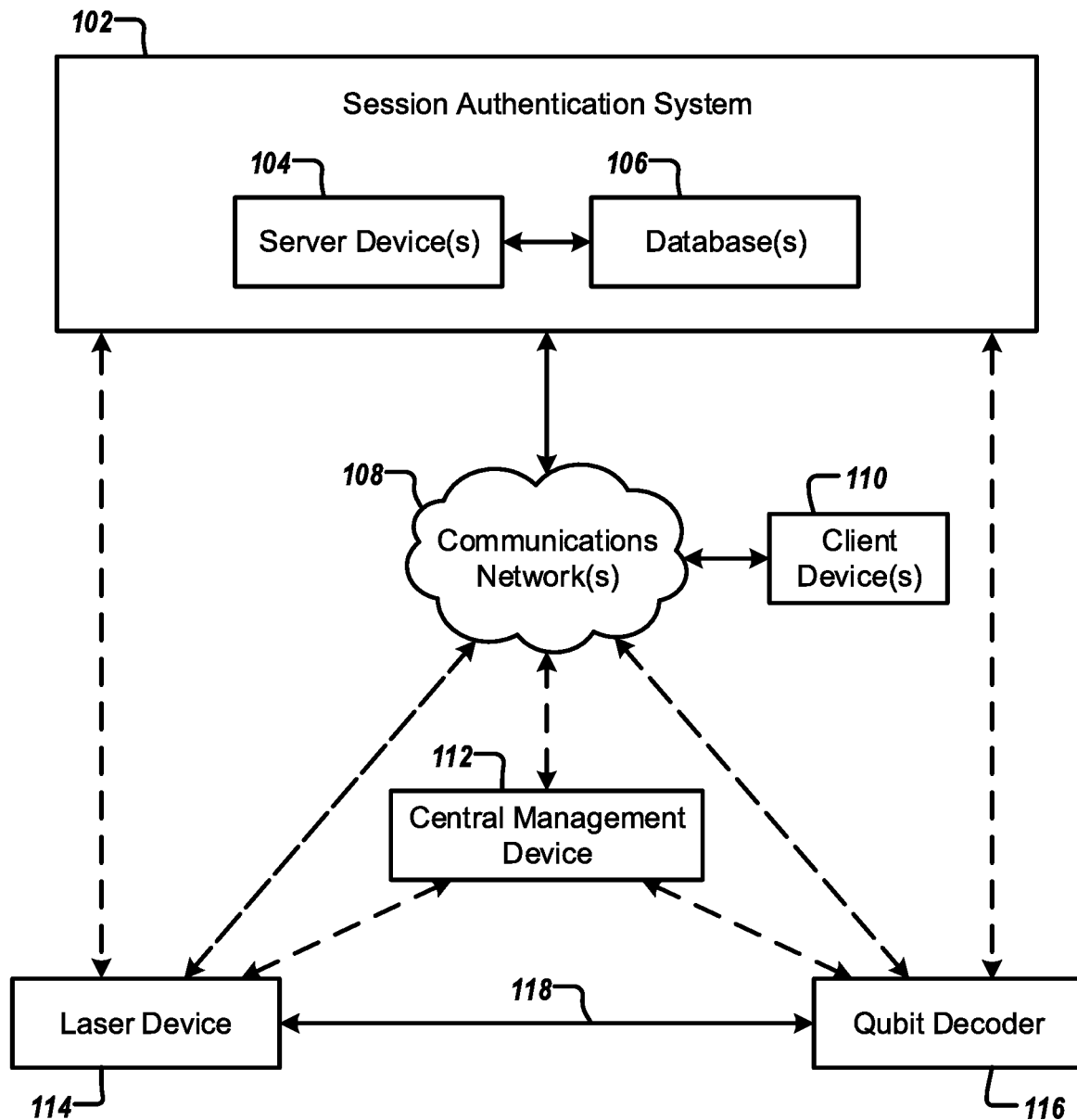
FIGS. 1A, 1B, 1C, and 1D illustrate system diagrams of sets of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for session authentication. Traditionally, it has been very difficult to select or generate a robust session key or ID (e.g., a unique number that is unlikely to be guessed or deciphered by a third party). In addition, there is typically no way to prove that the session ID is unattainable by a third party perpetrator. In an attempt to transmit data that are unattainable by a perpetrator, quantum key distribution (QKD) systems have been developed. In general terms, QKD systems exchange keys between two parties in a secure way that cannot be guessed. For instance, a one-time-pad quantum key exchange is impenetrable because a potential perpetrator eavesdropping on the transmission of a set of qubits representing a key will necessarily introduce errors in the set of qubits due to quantum uncertainty and indeterminacy of states, and thereby alerting the two parties to the attempted eavesdropping.

In contrast to these conventional QKD systems for transmitting keys securely, the present disclosure relates to a mechanism for generating unique keys in the first place. To do this, a session authentication system decodes a set of quantum states as quantum bits (qubits) using arbitrary quantum bases in order to generate a random number used to generate a session key or a random seed (e.g., a set of bits that is randomized due to quantum effects such as the principle of quantum uncertainty) for session key generation or seed for a pseudorandom number generation used to establish a secure session. When a bit measured and decoded using a quantum basis, the nature of quantum uncertainty and the indeterminacy of quantum states establishes that decoding the qubit will generate a bit that has some randomness. This randomness can then be used to prevent the reproduction of session keys by malicious attackers.

The present disclosure thus provides improved session authentication techniques by decoding quantum bits (qubits) using arbitrary sets of quantum bases in order to randomly generate a number that may be used to generate a session key or that may comprise a random seed for pseudorandom number generation used to establish a secure session. In one illustrative example, the present disclosure provides for sending pulses of photos, by a light source (e.g., a laser device), and decoding them using a quantum bases to generate a sequence of qubits. The quantum bases may comprise, for instance, the horizontal photon polarization state |0> and the vertical photon polarization state |1>. The quantum bases may alternatively or in addition comprise the left circular photon polarization state |L> and the right circular photon polarization state |R>, which are linear combinations of the vertical and horizontal photon polarization states |0> and |1>. Subsequently, the present disclosure provides for transmitting photon pulses by a light source to a qubit decoder (e.g., an optoelectronic device such as a polarized light demodulator (PLD)). In some instances, the present disclosure provides for generating, by the qubit decoder, a sequence of random bits by decoding (e.g., measuring) the received sequence of qubits using arbitrary quantum bases, which will thus introduce random errors in the set of decoded bits based on quantum uncertainty. The present disclosure then provides random bit values for a server device using the sequence of random bits as a random number to generate a session key or as a seed for pseudorandom number generation in session authentication.

The present disclosure thus provides improved passive session authentication techniques by encoding and decoding quantum bits (photons) using different sets of quantum bases in order to randomly generate a number that may be used to generate a session key or that may comprise a random seed for pseudorandom number generation used to establish a secure session. In one illustrative example, the present disclosure provides for encoding, by a laser device (e.g., a first optoelectronic device such as a polarized light modulator (PLM); a laser device), a sequence of bits using varied quantum bases to generate a sequence of photons. Each qubit may comprise any linear combination of two states in contrast with classical bit which could only include 1 or 0. The quantum bases may comprise, for instance, the horizontal photon polarization state |0> and the vertical photon polarization state |1>. The quantum bases may alternatively or in addition comprise the left circular photon polarization state |L> and the right circular photon polarization state |R>, which are linear combinations of the vertical and horizontal photon polarization states |0> and |1>. Subsequently, the present disclosure provides for transmitting the sequence of photons from the laser device to a qubit decoder (e.g., a second optoelectronic device such as a polarized light demodulator (PLD)). In some instances, the present disclosure provides for generating, by the qubit decoder, a sequence of random bits by decoding (e.g., measuring) the received sequence of photons using arbitrary quantum bases that will thus not match the quantum bases used to encode the sequence of photons, and which will thus introduce random errors in the decoded set of bits based on quantum uncertainty. The present disclosure then provides for a qubit decoder that generates a sequence of random bits and uses those bits as a random number to generate a session key or as a seed for pseudorandom number generation in session authentication.

In some embodiments, the present disclosure provides for a single laser device that is used in session authentication in a server farm by generating impenetrable random binary numbers unique to each recipient device, and unique each time at a single recipient device. In some instances, the laser device has no networking capability and generates photons (e.g., non-polarized photons) according to a computer program stored and executed internally. The laser device transmits the photons over a non-polarization maintaining optical fiber that feeds into a non-polarization maintaining optical switch out of which several non-polarization maintaining optical fibers branch out onto different recipient devices. The switches are programmed and controlled to transmit photons to any of the recipient devices, where each recipient device includes a qubit decoder. Once a recipient device receives the photons, the qubit decoder of that recipient device measures the quantum bits in its own determined quantum basis (or set of quantum bases) which could be any given or random quantum basis or set of quantum bases. Due to inconsistency between the two sets of quantum bases at the laser device and at the recipient device, the photons measured by the recipient device are truly random. A session server then can use the binary number from measured quantum bits for session authentication. In some embodiments, the binary number may be used directly as a session ID or key. Alternatively, the session server may use the pattern as a seed in a pseudo-random number generator. Such a seed will be completely random and unknown to outsiders. In some embodiments, each server may use its own arbitrary quantum basis to decode photons. In other embodiments, all of the servers may use the same quantum basis order or pattern. Due to quantum uncertainty, each time the quantum basis of any server is not the same as the quantum basis of the laser device, the qubit will be measured randomly at each server and thus each server will generate a different binary number. Even a single server measuring the same qubit sequence twice will generate two different binary numbers which are random in nature.

In some embodiments, a system for passive quantum session authentication is provided whose operations comprise transmitting single photon pulses from a central cloud-based system to a plurality of servers wherein the quantum bases used for encoding and decoding are different or the photons are not in a particular polarization state and thereby generating a bit stream that is inherently random. The bit stream may be used as a session key or otherwise used for session authentication.

There are many advantages of these and other embodiments described herein, such as: providing a session key that has truly random elements, and, as a result, facilitating the generation of a session key that cannot be reproduced by a third party. The session key or the seed generated in this way is inherently random and is unattainable to any perpetrator due to quantum uncertainty.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "quantum basis" refers to sets of orthogonal quantum states, such as pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state |0> and the vertical photon polarization state |1>. The "diagonal basis" refers to the pair of diagonal photonic polarization states comprising the diagonal photon polarization state of 45 degrees and the diagonal photon polarization state 135 degrees. The "circular basis" refers to the pair of circular photonic polarization states comprising the left circular photon polarization state |L> and the right circular photon polarization state |R>.

The term "optical line" refers to an optical communications path. For example, an optical line may comprise an optical fiber, an optical waveguide, a fiberoptic cable, a non-polarization maintaining optical fiber, a quantum line, or a combination thereof.

The term "quantum line" refers to a quantum communications path. For example, a quantum line may comprise a polarization-maintaining optical fiber (PMF or PM fiber), free space (e.g., air, vacuum), or a combination thereof. In some embodiments, a PM fiber uses birefringence to maintain the polarization states of photons. This is normally done by causing consistent asymmetries in the PM fiber. Example PM fiber types include: panda fiber which is used in telecom; elliptical clad fiber; and bowtie fiber. Any of these three designs uses birefringence by adding asymmetries to the fiber through shapes and stresses introduced in the fiber. This causes two polarization states to have different phase velocities in the fiber. As such, an exchange of the overall energy of the two modes (polarization states) becomes practically impossible.

The term "qubit decoder" is used herein to refer to any device that decodes a qubit of information on a photon. In this regard, the qubit decoder may comprise an optoelectronic device as described below.

The terms "optoelectronic device," "optoelectronic component," "laser device," "light source," "single photon source," and similar terms are used herein interchangeably to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), a semiconductor laser, a fiberoptic laser, or an edge-emitting laser (e.g., a gallium arsenide (GaAs) edge-emitting laser comprising an indium gallium arsenide (InGaAs) quantum well); a light source; a single photon source; a modulator or modulating circuit; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, attenuator, deflector, phase shifter, filter, mirror, window, diffuser, prism, lenses, crystals (e.g., non-linear crystals), wave plates, beam splitter, bit manipulator, polarizer, or diffraction grating; an interferometer implemented as a Mach-Zehnder interferometer (MZI), Fabry-Perot interferometer, Michelson interferometer, any other suitable configuration, or any combination or permutation thereof; any device configured to function as any of the foregoing devices; or any combination thereof. In some embodiments, the laser device may use a VCSEL to generate photons, qubits (e.g., by modulating photons), or both. In some embodiments, a polarization pulse shaper may be integrated with the laser chip on the same laser device. In some embodiments, modulating circuitry (e.g., a modulating circuit) may be implemented on a board. Examples of a laser device may comprise a fiberoptic laser with a polarizing component, an edge-emitting laser, a VCSEL, a PLM, or any other suitable device. In some embodiments, the laser may generate photons, qubits, or both in the infrared or near-infrared range (e.g., 1550 nanometers (nm), 980 nm, 900 nm). For example, a laser device may be an edge-emitting laser chip having a footprint smaller than one square millimeter and a thickness less than a few micrometers (microns) and comprising a gallium arsenide (GaAs)-based edge-emitting laser, a modulating circuit, and an attenuator or deflector.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by one or more laser devices, qubit decoders, switching devices, PRNG generating devices, server devices, remote server devices, cloud-based server devices, cloud utilities, or other devices.

Figure 1B:
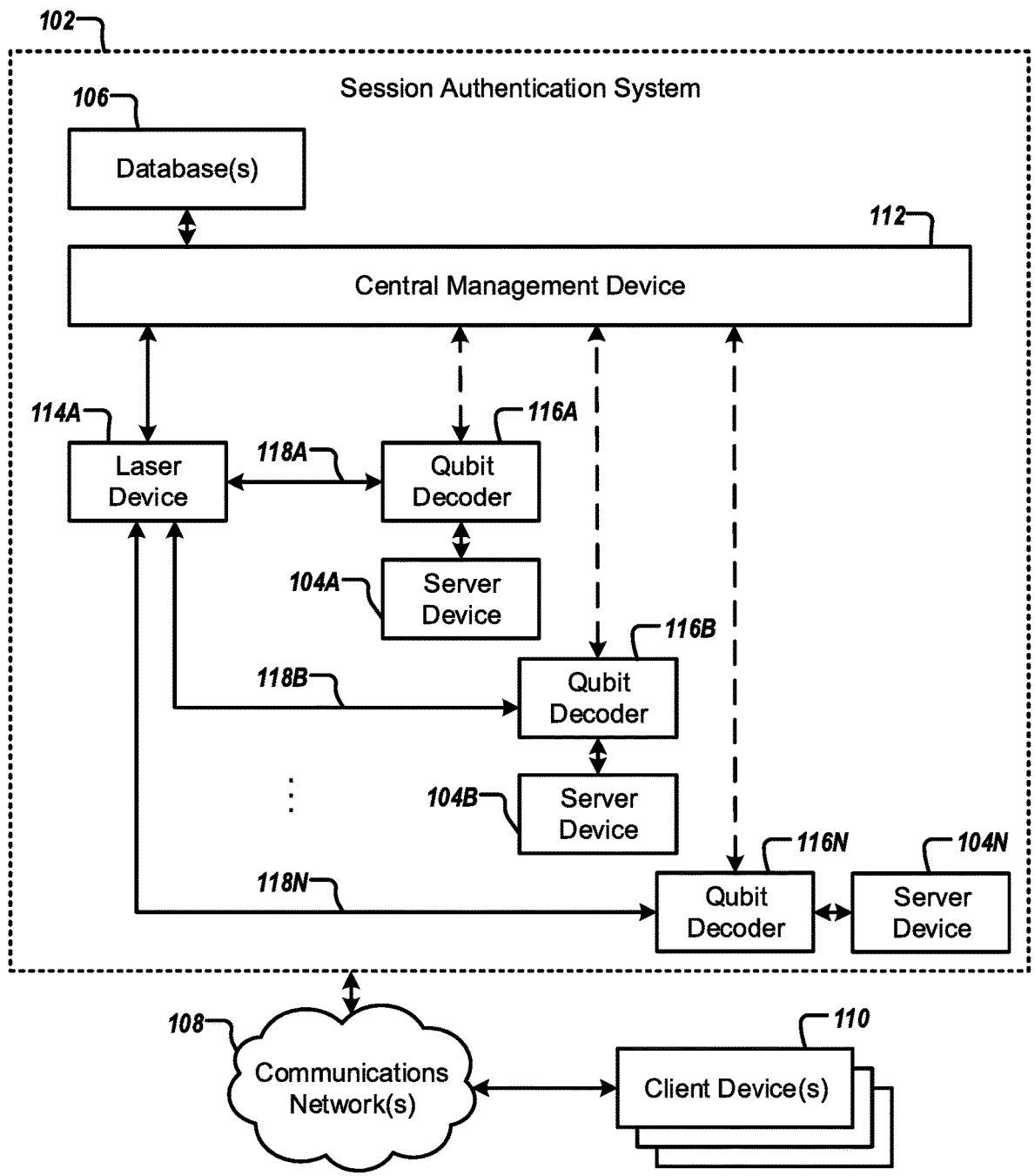
Figure 1C:
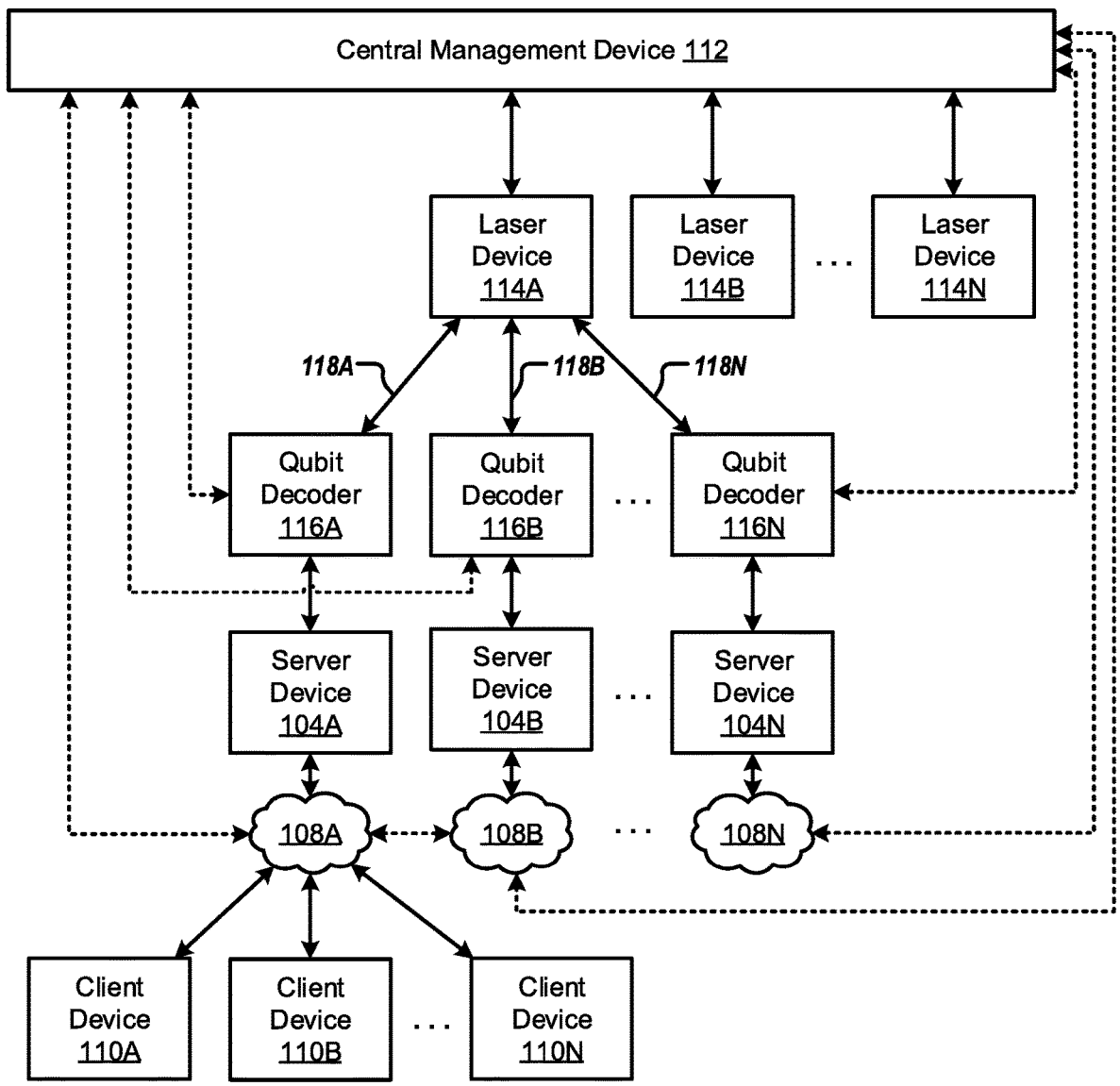
Figure 1D:
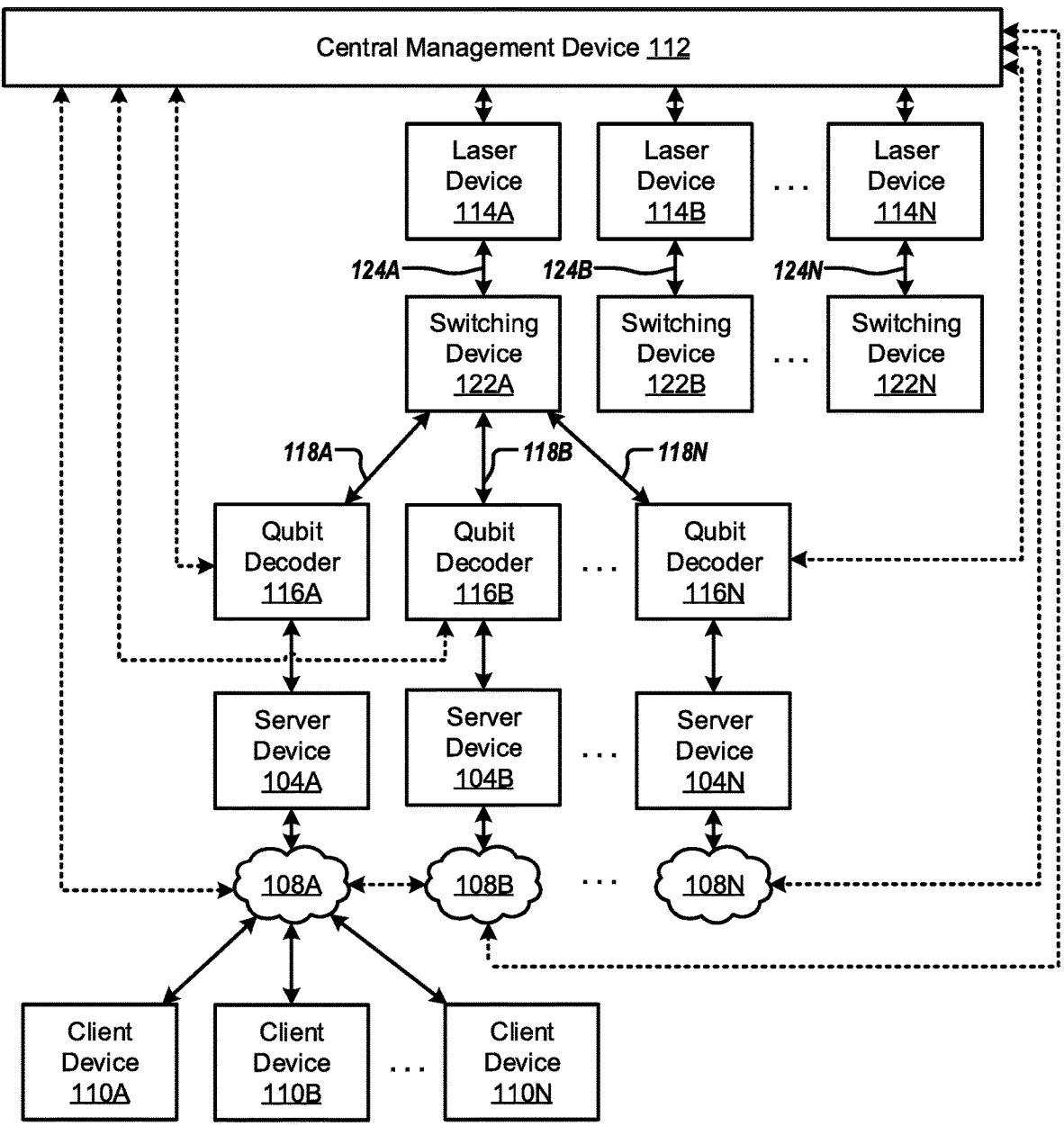

FIGS. 1A-1D illustrate system diagrams of sets of devices that may be involved in some example embodiments described herein. In this regard, FIG. 1A discloses an example environment 100 within which embodiments of the present disclosure may operate to authenticate sessions between devices. FIG. 1B discloses an alternative example environment 120 within which embodiments of the present disclosure may operate to authenticate sessions between devices. FIG. 1C discloses another alternative example environment 140 within which embodiments of the present disclosure may operate to authenticate sessions between devices. FIG. 1D discloses another alternative example environment 160 within which embodiments of the present disclosure may operate to authenticate sessions between devices.

As illustrated in FIGS. 1A-1D, a session authentication system 102 may include one or more session authentication system server devices 104 (e.g., 104A-104N) in communication with one or more session authentication system databases 106. The session authentication system 102 may be embodied as one or more computers or computing systems as described herein. The session authentication system 102 may be in communication with one or more client devices 110 (e.g., 110A-110N), central management device 112, one or more laser devices 114 (e.g., 114A-114N), one or more qubit decoders 116 (e.g., 116A-116N), or a combination thereof through one or more communications networks 108 (e.g., 108A-108N). One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof.

In some embodiments, the session authentication system 102 may generate session IDs for secure authentication of communication sessions between any of the one or more client devices 110 and one or more other devices (e.g., one or more session authentication system server devices 104, or one or more other devices not shown in FIGS. 1A-1D). To generate a particular session ID, the session authentication system 102 may invoke use of the central management device 112, one or more laser devices 114, and one or more qubit decoders 116, as described below.

The one or more session authentication system server devices 104 may be embodied as one or more servers, remote servers, cloud-based servers (e.g., cloud utilities), processors, or any other suitable server devices, or any combination thereof. The one or more session authentication system server devices 104 receive, process, generate, and transmit data, signals, and electronic information to facilitate the operations of the session authentication system 102. The one or more session authentication system server devices 104 may include, for example, session authentication system server device 104A, session authentication system server device 104B, through session authentication system server device 104N, where N represents an alphabetic, numeric, or alphanumeric identifier. For example, in some instances the one or more session authentication system server devices 104 may include over 100,000 session authentication system servers.

The one or more session authentication system databases 106 may be embodied as one or more data storage devices, such as a Network Attached Storage (NAS) device or devices, or as one or more separate databases or servers. The one or more session authentication system databases 106 may store information received, retrieved, accessed, and generated by the session authentication system 102 to facilitate the operations of the session authentication system 102. For example, the one or more session authentication system databases 106 may store control signals, electronic information indicative of one or more quantum bases, time-dependent photon generation schedules, time-dependent decoding schedules, unit-dependent photon generation schedules, unit-dependent decoding schedules, pseudo-random quantum basis selection techniques, and combinations thereof. In another example, the one or more session authentication system databases 106 may store device characteristics, and user account credentials for the central management device 112, one or more of the one or more laser devices 114, one or more of the one or more qubit decoders 116, or a combination thereof. In another example, the one or more session authentication system databases 106 may store device characteristics and user account credentials for one or more of the one or more client devices 110.

The one or more client devices 110 (e.g., 110A-110N) may be embodied by any computing device known in the art. Information received by the session authentication system 102 from the one or more client devices 110 may be provided in various forms and via various methods. For example, the one or more client devices 110 may be laptop computers, smartphones, netbooks, tablet computers, wearable devices, desktop computers, electronic workstations, automated transaction machines (ATMs), or the like, and the information may be provided to the session authentication system 102 through various modes of data transmission provided by these client devices. In some embodiments, the one or more client devices 110 may include or store various data and electronic information associated with one or more users. In some embodiments, the one or more client devices 110 may include, for example, client device 110A (e.g., a smartphone), client device 110B (e.g., a laptop computer), through client device 110N (e.g., an ATM), where N represents an alphabetic, numeric, or alphanumeric identifier. For example, in some instances the one or more client devices 110A-110N may include over 1,000,000 client devices, and the session authentication system 102 may authenticate over 1,000,000 sessions per hour.

In embodiments where a client device 110 is a mobile device, such as a smartphone or tablet, the mobile device may execute an "app" (e.g., a thin-client application) to interact with the session authentication system 102, one or more session authentication system server devices 104, or a combination thereof. In some embodiments, the mobile device may comprise a mobile operating system that provides for improved communication interfaces for interacting with external devices. Communication with hardware and software modules executing outside of the app may be provided via APIs provided by the mobile device operating system.

The central management device 112 may be embodied as one or more computers or computing systems as known in the art. For instance, the central management device 112 may be embodied as one or more servers, remote servers, cloud-based servers (e.g., cloud utilities), processors, or any other suitable server devices, or any combination thereof. In some embodiments, the central management device 112 may include or store various data and electronic information. For example, the central management device 112 may store control signals, electronic information indicative of one or more quantum bases, time-dependent photon generation schedules, time-dependent decoding schedules, unit-dependent photon generation schedules, unit-dependent decoding schedules, pseudo-random quantum basis selection techniques, and combinations thereof. In another example, the central management device 112 may store one or more databases, tables, or maps of quantum bases; links or pointers to one or more quantum bases contained therein; and combinations thereof. In another example, the central management device 112 may store device characteristics, and user account credentials for the central management device 112, one or more of the one or more laser devices 114, one or more of the one or more qubit decoders 116, or a combination thereof. In another example, the central management device 112 may store device characteristics and user account credentials for one or more of the one or more client devices 110.

In some embodiments, the central management device 112 may be configurable by a user using a computing device. For example, the user may use the computing device to control how the central management device 112 determines the various quantum bases and schedules described herein. For example, the user may use the computing device to increase or decrease the complexity of the quantum basis determination process used by the central management device 112. In one illustrative example, the user may use the computing device to instruct the central management device 112 to utilize a first quantum basis determination process (e.g., that increases the amount of quantum bases in the set of quantum bases to two or more quantum bases) when client device 110A requires a highly secure session, such as when client device 110A is accessing a financial website or when client device 110A is associated a geolocation requiring higher security. In another illustrative example, the user may use the computing device to instruct the central management device 112 to utilize a second quantum basis determination process (e.g., that decreases the amount of quantum bases in the set of quantum bases to one quantum basis) when client device 110B requires less secure session, such as when client device 110B is accessing a content browsing website.

In some embodiments, the central management device 112 may be connected the session authentication system 102 either directly or via one or more communications networks 108. In some embodiments (e.g., as shown in FIG. 1B), the central management device 112 may be a component of the session authentication system 102. However, in other embodiments, the central management device 112 is not a part of or connected, directly or indirectly, to the session authentication system 102 in order to prevent communication of information regarding the photon generation or decoding procedures outlined herein between the central management device 112 and the session authentication system 102. The central management device 112 may include one or more databases (not shown for brevity) storing sets of quantum bases, control signals, device characteristics, and user account credentials for one or more of the one or more laser devices 114, one or more of the one or more qubit decoders 116, or a combination thereof.

The central management device 112 may be connected to one or more laser devices 114 (e.g., 114A-114N). In various embodiments, one or more of these connections may be through the one or more communications networks 108. In other embodiments, one or more of these connections may be a direct connection through a non-network communications path (e.g., a direct wired or wireless communications path). In some embodiments, the laser device 114 may be a component of the central management device 112, rather than a separate device, although it is illustrated as a separate device in FIGS. 1A-1D for ease of explanation. Laser device 114, in turn, is connected to one or more qubit decoders 116 (e.g., 116A-116N) through one or more optical lines 118 (e.g., 118A-118N). In some embodiments, the one or more optical lines 118 may comprise one or more non-polarization maintaining optical fibers to introduce additional error (e.g., to scramble the qubits transmitted through the fiber). The one or more qubit decoders 116, in turn, may be connected to session authentication system 102. In various embodiments, one or more of these connections may be through the one or more communications networks 108. In other embodiments, one or more of these connections may be a direct connection through a non-network communications path (e.g., a direct wired or wireless communications path). In some embodiments, the qubit decoder 116 may be a component of the of the central management device 112 rather than a separate device, although it is illustrated as a separate device in FIGS. 1A-1D for ease of explanation.

Each of the one or more laser devices 114 may be embodied by any suitable laser device, such as a diode laser, a VCSEL, a semiconductor laser, a fiberoptic laser, or an edge-emitting laser. In some embodiments, the laser device 114 may include or store various data and electronic information. For example, the laser device 114 may include or store one or more control signals, time-dependent photon generation schedules, unit-dependent photon generation schedules, or any combination thereof. Alternatively, some or all of this information may be stored in the central management device 112, the session authentication system 102, or a combination of the central management device 112 and the session authentication system 102. In some embodiments, the laser device 114 may comprise photonic generation circuitry configured to generate photon pulses and transmit the generated photon pulses over an optical line 118, wherein the photons are not polarized. In some embodiments, the laser device 114 may include programmable firmware for receiving control signals and electronic instructions. In some embodiments, the laser device 114 may be configured to generate a series of photons (e.g., a stream of photons, one or more photon pulses, a sequence of single photons), where each photon is not polarized. The laser device 114 may be further configured to transmit the series of photons to the qubit decoder 116 over an optical line 118. In some embodiments, the one or more laser devices 114 may include, for example, laser device 114A, laser device 114B, through laser device 114N, where N represents an alphabetic, numeric, or alphanumeric identifier. For example, in some instances the one or more laser devices 114A-114N may include over 100,000 laser devices.

Each of the one or more qubit decoders 116 may be embodied by any suitable qubit decoder, such as an optoelectronic device (e.g., a PLD). In some embodiments, the qubit decoder 116 may include or store various data and electronic information. For example, the qubit decoder 116 may include or store one or more control signals, electronic information indicative of one or more quantum bases, time-dependent decoding schedules, unit-dependent decoding schedules, pseudo-random quantum basis selection techniques, or any combination thereof. Alternatively, some or all of this information may be stored in the central management device 112, the session authentication system 102, or a combination of the central management device 112 and the session authentication system 102. The qubit decoder 116 is communicatively coupled to the laser device 114 by the optical line 118 and is configured to receive a series of photons from the laser device 114 over the optical line 118. In some embodiments, the qubit decoder 116 may comprise a bit manipulator circuit configured to convert the qubit measurement into a stream of classical bits. The qubit decoder 116 may be further configured to determine a set of quantum bases and decode the received series of photons based on the determined set of quantum bases to generate a set of bits. The set of bits will thus include a random component. In some embodiments, the qubit decoder 116 is configured to not transmit the set of quantum bases. In some embodiments, the one or more qubit decoders 116 may include, for example, qubit decoder 116A, qubit decoder 116B, through qubit decoder 116N, where N represents an alphabetic, numeric, or alphanumeric identifier. For example, in some instances the one or more qubit decoders 116A-116N may include over 100,000 qubit decoders.

In some embodiments, the laser device 114 may be a cloud-based laser device that may transmit pulses of single photons to one or more qubit decoders 116. A qubit decoder 116 may receive the pulses of single photons and use any (e.g., arbitrary) set of quantum bases to measure the polarization of the photon pulses and decode photons. Since the received photons are not polarized, the polarization measurement at the qubit decoder 116 results in completely random decoded bits even if the qubit decoder 116 uses only one quantum basis to decode all the photons.

Turning to FIGS. 1B-1D, in some embodiments each laser device 114 may be communicatively coupled to a plurality of qubit decoders 116. For example, as shown in FIGS. 1B and 1C, laser device 114A may be communicatively coupled to qubit decoder 116A through optical line 118A; laser device 114A may be communicatively coupled to qubit decoder 116B through optical line 118B; and laser device 114A may be communicatively coupled to qubit decoder 116N through optical line 118N. The one or more qubit decoders 116A-116N are, in turn, communicatively coupled to one or more session authentication system server devices 104A-104N. Each session authentication system server device 104A-104N may be in communication with one or more client devices 110A-110N through one or more communications networks 108A-108N, one or more non-network communications paths, or a combination thereof. Each session authentication system server device 104A-104N may generate session IDs based on data received from corresponding qubit decoders 116A-116N to facilitate secure authentication of communication sessions between the corresponding session authentication system server devices 104A-104N and one or more client devices communicatively coupled to one or more communications networks 108A-108N as described in further detail herein. For example, session authentication system server device 104A may generate session IDs based on data received from corresponding qubit decoder 116A to facilitate secure authentication of communication sessions between the session authentication system server device 104A and the one or more client devices 110A-110N communicatively coupled to one or more communications networks 108A. In another example, session authentication system server device 104B may generate session IDs based on data received from corresponding qubit decoder 116B to facilitate secure authentication of communication sessions between the session authentication system server device 104B and one or more client devices communicatively coupled to one or more communications networks 108B. In another example, session authentication system server device 104N may generate session IDs based on data received from corresponding qubit decoder 116N to facilitate secure authentication of communication sessions between the session authentication system server device 104N and one or more client devices communicatively coupled to one or more communications networks 108N.

In some embodiments, the laser device 114A may be a cloud-based laser device configured to encode a series of photons and transmit (e.g., over one or more optical lines 118A-118N; over one or more optical lines 124A-124N to one or more switching devices 122A-122N and over one or more optical lines 118A-118N) the photons to a plurality of qubit decoders 116A-116N communicatively coupled to a plurality of session authentication system server devices 104A-104N. In some embodiments, the one or more optical lines 124 may comprise one or more non-polarization maintaining optical fibers to introduce additional error (e.g., to scramble the qubits transmitted through the fiber). In response, each of the plurality of qubit decoders 116A-116N may use their own determined set of quantum bases to decode the received photons, generate a decoded set of bits, and transmit the decoded set of bits to a respective one of the plurality of session authentication system server devices 104A-104N.

In some embodiments, the one or more session authentication system server devices 104A-104N may be located within a server farm. For example, session authentication system server device 104A and session authentication system server device 104B may be located within the walls of a building warehouse of a server farm or otherwise within a geographic footprint of the server farm. In some embodiments, the one or more qubit decoders 116A-116N may be located within the server farm. In some embodiments, the one or more qubit decoders 116A-116N may be located outside the server farm. For example, the one or more qubit decoders 116A-116N may be located outside the geographic footprint of the server farm. In some embodiments, the one or more laser devices 114A-114N may be located within the server farm. In some embodiments, the one or more laser devices 114A-114N may be located outside the server farm. For example, the one or more laser devices 114A-114N may be located outside the geographic footprint of the server farm.

In some embodiments, as shown in FIG. 1D, each laser device 114A-114N may be communicatively coupled to one or more switching devices 122A-122N through one or more optical lines 124A-124N. For example, laser device 114A may be communicatively coupled to one or more switching devices 122A at least partially through optical line 124A; laser device 114B may be communicatively coupled to one or more switching devices 122B at least partially through optical line 124B; and laser device 114N may be communicatively coupled to one or more switching devices 122N at least partially through optical line 124N. In some embodiments, each switching device 122A-122N may be communicatively coupled to one or more qubit decoders 116A-116N through one or more optical lines 118A-118N. For example, one or more switching devices 122A may be communicatively coupled to qubit decoder 116A at least partially through optical line 118A; one or more switching devices 122A may be communicatively coupled to qubit decoder 116B at least partially through optical line 118B; and one or more switching devices 122A may be communicatively coupled to qubit decoder 116N at least partially through optical line 118N.

In some embodiments, the laser device 114A may be configured to transmit a series of photons to the one or more switching devices 122A over one or more optical lines 124A. The one or more switching devices 122A may in turn be further configured to transmit the series of photons to a corresponding qubit decoder 116A-116N over a corresponding optical line 118A-118N. In some such embodiments, the laser device 114A may be without network connection capability and incapable of communicating with a communications network (e.g., one or more communications networks 108) or even with other components within the session authentication system 102. When foregoing network connection capability in this fashion, a laser device 114A is incapable of transmitting the settings used to generate photons, and communications security is, in some instances, improved because a perpetrator may not be able to acquire those settings.

The one or more switching devices 122 (e.g., 122A-122N) may be embodied by any suitable switching device, such as a non-polarization maintaining switching device, an optical switching device, an electro-optical switching device, a microelectromechanical systems (MEMS) switching device, a non-polarization maintaining fiber coupling, a splitter, or any other suitable device. In some instances, the one or more switching devices 122 may comprise one or more non-polarization maintaining switches that are non-mechanical and operate with all optical fast-switching components with less than 0.5 dB of loss. In some embodiments, each of the one or more switching devices 122 may be embodied by a plurality of cascading switching devices. For example, the one or more switching devices 122A may be embodied by three cascading switching devices. In some embodiments, non-polarization maintaining fiber and switches may be used to ensure that the state of the photon is not maintained and to provide for an increased level of randomness.

In some embodiments, the one or more switching devices 122A may be configured to receive photons from a laser device 114A over one or more optical lines 124A. In some embodiments, the one or more switching devices 122A may be configured to transmit subsets of received photons to qubit decoders 116A-116N by switching between optical lines 118A-118N. In some embodiments, the one or more switching devices 122A may be configured to switch between optical lines 118A-118N at a frequency greater than one megahertz (MHz). In some embodiments, the one or more switching devices 122A may be configured to switch between optical lines 118A-118N at a frequency greater than one megahertz (MHz). In these embodiments, the session authentication system 102 may be configured to authenticate over 100,000 sessions at the same time (or at nearly the same time).

In some embodiments, the one or more qubit decoders 116A-116N are communicatively coupled to the laser device 114A via a combination including optical line 124A, switching device 122A, and a corresponding one of optical lines 118A-118N. The one or more qubit decoders 116A-116N are configured to receive a series of photons from the laser device 114A via the optical line 124A, the switching device 122A, and the corresponding optical lines 118A-118N.

In one illustrative embodiment, a laser device 114A may be configured to generate a series of photons comprising a first subseries of photons and a second subseries of photons, and transmit the series of photons to switching device 122A over optical line 124A. The switching device 122A may be in communication with the laser device 114A over the optical line 124A and configured to receive the series of photons from the laser device 114A over the first optical line 124A. The switching device 122A may be further configured to transmit the first subseries of photons to qubit decoder 116A over optical line 118A, and transmit the second subseries of photons to qubit decoder 116B over optical line 118B. The qubit decoder 116A may be in communication with the switching device 122A over the optical line 118A and configured to: determine a first set of quantum bases; receive the first subseries of photons from the switching device 122A over the optical line 118A; and decode, based on the first set of quantum bases, the first subseries of photons to generate a first set of bits. The qubit decoder 116A may thereafter transmit the first set of bits to a corresponding session authentication system server device 104A that is configured to generate a first number based on the first set of bits and authenticate a first session based on the generated first number. The qubit decoder 116B may be in communication with the switching device 122A over the optical line 118B and configured to: determine a second set of quantum bases; receive the second subseries of photons from the switching device 122A over the optical line 118B; and decode, based on the second set of quantum bases, the second subseries of photons to generate a second set of bits. The second set of quantum bases may be the same as, or different from, the first set of quantum bases. The qubit decoder 116B may thereafter transmit the second set of bits to a corresponding session authentication system server device 104B that is configured to generate a second number based on the second set of bits and authenticate a second session based on the generated second number.

Turning back to FIGS. 1A-1D, in some embodiments, the session authentication system 102, the central management device 112, or both may provide for determining a set of quantum bases, generating a control signal indicative of the set of quantum bases, and transmitting the control signal over one or more communications networks 108 to qubit decoder 116. The session authentication system 102, the central management device 112, or both may provide for generating a photonic control signal indicative of an instruction to generate a series of photons and transmitting the photonic control signal one or more communications networks 108 to laser device 114.

In some embodiments, the laser device 114 may be configured to receive the photonic control signal and, in response to receipt of the photonic control signal, generate the series of photons. The laser device 114 may store the photonic control signal in memory. In some instances, the laser device 114A may generate the series of photons on the fly (e.g., in response to processing the photonic control signal). In some embodiments, the laser device 114 may be configured to transmit the series of photons over optical line 118 to qubit decoder 116. In some embodiments, the qubit decoder 116 may be configured to determine a set of quantum bases. In some embodiments, the qubit decoder 116 may be configured to receive the control signal indicative of the set of quantum bases. In some embodiments, the qubit decoder 116 may be configured to receive the series of photons over the optical line 118 and decode the series of photons based on the set of quantum bases to generate a decoded set of bits. In some embodiments, the qubit decoder 116A may be configured to transmit the decoded set of bits to session authentication system server device 104A.

In some embodiments, the central management device 112 may be configured to transmit, to qubit decoder 116, a control signal indicative of a determined quantum basis or a determined set of quantum bases (e.g., a set of zero or more quantum bases). The qubit decoder 116 may store the control signal in memory. In some embodiments, the central management device 112 may be configured to transmit, to laser device 114, a photonic control signal indicative of an instruction to generate a series of photons. In response to receipt of the photonic control signal, the laser device 114 may generate the series of photons (e.g., using photonic generation circuitry). In some embodiments, the central management device 112 may be configured to transmit, to qubit decoder 116, a control signal indicative of an instruction to decode a series of photons (e.g., based on the determined quantum basis or the determined set of quantum bases; based on a second quantum basis or a second set of quantum bases; based on a third quantum basis or a third set of quantum bases). In some embodiments, each qubit decoder 116 may be communicatively coupled to a session authentication system server device 104. For example, qubit decoder 116A may be communicatively coupled to session authentication system server device 104A; qubit decoder 116B may be communicatively coupled to session authentication system server device 104B; and qubit decoder 116N may be communicatively coupled to session authentication system server device 104N.

In some instances, the qubit decoder 116A may retrieve the set of quantum bases from local memory in response to receiving the series of photons. In other instances, the control signal may comprise one or more links or pointers to the set of quantum bases contained in the database of quantum bases, the table of quantum bases, or the map of quantum bases stored in the remote memory, or in a separate database of quantum bases, table of quantum bases, or map of quantum bases stored in remote memory (e.g., central management device 112, one or more session authentication system databases 106, or both). The qubit decoder 116A may retrieve the set of quantum bases from the remote memory based on the one or more links or pointers. In still other instances, the qubit decoder 116A may determine the set of quantum bases on the fly (e.g., in response to receiving the series of photons; in response to processing a control signal). In still other instances, the qubit decoder 116A may receive the set of quantum bases from a third-party device.

Each of the one or more session authentication system server devices 104A-104N may be configured to authenticate a session based on a generated number. In some embodiments, each of the one or more session authentication system server devices 104A-104N may be configured to generate a session key based on the generated number. In some embodiments, the one or more session authentication system server devices 104A-104N may be configured to generate a seed for pseudo-random number generation based on the generated number, and generate a pseudo-random number based on the seed, wherein generation of the session key is based on the pseudo-random number. In some instances, the generated number is the session key.

In some embodiments, each session authentication system server device 104 may be communicatively coupled to a plurality of client devices. For example, session authentication system server device 104A may be communicatively coupled to a first set of client devices comprising client device 110A, client device 110B, and client device 110N; session authentication system server device 104B may be communicatively coupled to a second set of client devices; and session authentication system server device 104N may be communicatively coupled to a third set of client devices.

In some embodiments, the one or more session authentication system server devices 104A-104N may use a generated session key to authenticate a session between the one or more session authentication system server devices 104A-104N and one or more client devices 110A-110N. For example, session authentication system server device 104A may generate a first session key to authenticate a session between session authentication system server device 104A and one of client devices 110, and session authentication system server device 104B may generate a second session key to authenticate a session between session authentication system server device 104B and another of client devices 110. In another example, a single session authentication system server device 104A may generate a first session key to authenticate a session between session authentication system server device 104A and client device 110A, and may also generate a second session key to authenticate a session between session authentication system server device 104A and client device 110B.

The one or more client devices 110A-110N may be embodied by any computing device known in the art. In some embodiments, the one or more client devices 110A-110N may comprise or be coupled to one or more laptop computers, smartphones, netbooks, tablet computers, wearable devices desktop computers, electronic workstations, kiosks, automated transaction machines (ATMs), or the like. The session authentication system 102 may receive information from, and transmit information to, the one or more client devices 110A-110N. For example, the session authentication system 102 may authenticate sessions between the one or more session authentication system server devices 104A-104N and the one or more client devices 110A-110N. It will be understood that in some embodiments, the client devices 110A-110N need not themselves be client devices, but may be peripheral devices communicatively coupled to client devices.

In one illustrative embodiment, a user may use client device 110A to log in to a website that utilizes one or more cookies. In response to client device 110A logging in to the website, session authentication system server device 104A may determine to create a session, generate a request for a random number, and transmit the request for the random number to the central management device 112. The central management device 112 may receive the request for the random number and initiate a process based on any of the various embodiments or combination of embodiments described herein that results in generation, by qubit decoder 116A, of a decoded set of bits. The qubit decoder 116A may then transmit the decoded set of bits to the session authentication system server device 104A. The session authentication system server device 104A may receive the decoded set of bits, generate a session key based on the decoded set of bits, and transmit (or, in some instances, perform a quantum key distribution process that includes transmitting) the session key to client device 110A for use in session authentication.

In some embodiments, the qubit decoder 116 may be configured to decode various photons of the series of photons based on multiple quantum bases, such as a first quantum basis, a second quantum basis different from the first quantum basis, and in some embodiments, additional quantum bases different from the first or the second quantum bases. For instance, a first quantum basis used for decoding a first photon of the series of photons may comprise a first pair of orthogonal photonic polarization states selected at least partially from the group consisting of a pair of rectilinear photonic polarization states, a pair of diagonal photonic polarization states, and a pair of circular photonic polarization states; and a second quantum basis used for decoding a second photon of the series of photons may comprise a second pair of orthogonal photonic polarization states selected at least partially from the group but that are different from the first pair of orthogonal photonic polarization states. In some instances, a third quantum basis used for decoding a third photon of the series of photons may be the same as, or different from, the first quantum basis. For example, the first quantum basis may comprise a first pair of orthogonal photonic polarization states selected at least partially from the group consisting of a pair of rectilinear photonic polarization states, a pair of diagonal photonic polarization states, and a pair of circular photonic polarization states; the second quantum basis may comprise a second pair of orthogonal photonic polarization states different from the first pair of orthogonal photonic polarization states and selected from the same group; and the third quantum basis may comprise a third pair of orthogonal photonic polarization states different from the second pair of orthogonal photonic polarization states and selected from the same group. In one illustrative example, the first quantum basis may be the rectilinear basis, the second quantum basis may be the diagonal basis, and the third quantum basis may be the rectilinear basis or the circular basis. In another illustrative example, the first quantum basis may be the rectilinear basis, the second quantum basis may be the circular basis, and the third quantum basis may be the rectilinear basis or the diagonal basis. In yet another illustrative example, the first quantum basis may be the diagonal basis, the second quantum basis may be the rectilinear basis, and the third quantum basis may be the diagonal basis or the circular basis. In yet another illustrative example, the first quantum basis may be the diagonal basis, the second quantum basis may be the circular basis, and the third quantum basis may be the rectilinear basis or the diagonal basis. In yet another illustrative example, the first quantum basis may be the circular basis, the second quantum basis may be the rectilinear basis, and the third quantum basis may be the diagonal basis or the circular basis. In yet another illustrative example, the first quantum basis may be the circular basis, the second quantum basis may be the diagonal basis, and the third quantum basis may be the rectilinear basis or the circular basis.

The qubit decoder 116 is configured to transmit, to the session authentication system 102, the set of bits generated by decoding the received series of photons. This transmission may occur either via one or more communications networks 108 or via a non-network communication path (although in embodiments where the qubit decoder 116 comprises a component of the session authentication system 102, internal conveyance of the set of bits may occur via an internal system bus (not shown for sake of brevity), or may not need to occur at all). The session authentication system 102 is configured to then generate a number based on the set of bits (e.g., using all of the bits in the set of bits without discarding any of the bits in the set of bits). In some embodiments, the set of bits may comprise an entirety of the generated number. In some embodiments, the set of quantum bases is not transmitted by the qubit decoder 116. In some embodiments, the generated number cannot reliably be recreated due to the randomization introduced by the quantum effect triggered from use of the set of quantum bases during decoding of a series of non-polarized photons. In some embodiments, the qubit decoder 116 may be configured to transmit electronic information indicative of the set of quantum bases to the laser device 114, the session authentication system 102, or both. In some embodiments, the qubit decoder 116 may be configured to not transmit any electronic information indicative of any of the set of quantum bases to any other device.

In some embodiments, the session authentication system 102 may be configured to generate a session key based on the generated number. In some embodiments, the session authentication system 102 may be configured to generate a seed for pseudo-random number generation based on the generated number, and generate a pseudo-random number based on the seed, wherein generation of the session key is based on the pseudo-random number. In some instances, the generated number is the session key. The session authentication system 102 may use the generated session key to authenticate a session between a client device 110 and another device.

As a foundation for some embodiments, the central management device 112 may be configured to determine a set of quantum bases, generate a control signal indicative of the set of quantum bases, and transmit the control signal over one or more communications networks 108 to qubit decoder 116. In some embodiments, the central management device 112 may be configured to generate a photonic control signal indicative of an instruction to generate a series of photons and transmit the photonic control signal over one or more communications networks 108 to laser device 114. In some embodiments, the laser device 114 may be configured to receive the photonic control signal over one or more communications networks 108. In response to receipt of the photonic control signal, the laser device 114 may be configured to generate the series of photons. In some embodiments, the laser device 114 may be configured to transmit the series of photons over optical line 118 to qubit decoder 116. In some embodiments, the qubit decoder 116 may be configured to receive the control signal over one or more communications networks 108. In some embodiments, the qubit decoder 116 may be configured to receive the series of photons over the optical line 118 and decode the series of photons based on the determined set of quantum bases to generate a decoded set of bits. In some embodiments, the qubit decoder 116 may be configured to transmit the decoded set of bits to the session authentication system server device 104 over one or more communications networks 108. The session authentication system server device 104 may be configured to receive the decoded set of bits over one or more communications networks 108, generate a session key based on the decoded set of bits (e.g., by generating a random number based on the decoded set of bits), and transmit the session key over one or more communications networks 108 to client device 110 for use in session authentication.

As a foundation for some embodiments, the qubit decoder 116, the central management device 112, or both may provide for determining, selecting, choosing, or identifying the set of quantum bases for decoding the series of photons. As a foundation for some embodiments, the qubit decoder 116, the central management device 112, or both may provide for generating a control signal indicative of an instruction to decode photons based on a set of quantum bases that has been selected, chosen, determined, or identified by the qubit decoder 116, the central management device 112, or both.

In some embodiments, the laser device 114, the central management device 112, or both may be configured to generate a time-dependent photon generation schedule comprising a first plurality of quantum bases respectively corresponding to a first plurality of time periods. In some instances, the central management device 112 may be configured to transmit the time-dependent photon generation schedule to the laser device 114. The laser device 114 may be configured to receive the time-dependent photon generation schedule and generate a series of photons based on the time-dependent photon generation schedule. For example, an example time-dependent photon generation schedule may comprise electronic information indicative of instructions to generate a first subseries of photons during a first time period (e.g., a first 10 nanoseconds), a second subseries of photons during a second time period (e.g., the next 20 nanoseconds), a third subseries of photons during a third time period (e.g., the next 50 nanoseconds), and a fourth subseries of photons during a fourth time period (e.g., the next 20 nanoseconds), after which the time-dependent photon generation schedule may repeat.

In some embodiments, the qubit decoder 116, the central management device 112, or both may be configured to generate a time-dependent decoding schedule comprising a plurality of quantum bases respectively corresponding to a plurality of time periods. In some instances, the central management device 112 may be configured to transmit the time-dependent decoding schedule to the qubit decoder 116. The qubit decoder 116 may be configured to receive the time-dependent decoding schedule and decode photons based on the time-dependent decoding schedule. For example, an example time-dependent decoding schedule may comprise electronic information indicative of instructions to decode photons based on a diagonal basis during a first time period (e.g., a first 5 nanoseconds), a rectilinear basis during a second time period (e.g., the next 30 nanoseconds), and a circular basis during a third time period (e.g., the next 10 nanoseconds), after which the time-dependent decoding schedule may repeat.

It will be appreciated that other patterns of quantum basis selection may be utilized as well. In some embodiments, the laser device 114, the central management device 112, or both may be configured to generate a unit-dependent photon generation schedule. In some instances, the central management device 112 may be configured to transmit the unit-dependent photon generation schedule to the laser device 114. The laser device 114 may be configured to receive the unit-dependent photon generation schedule and generate a series of photons based on the unit-dependent photon generation schedule. For example, an example unit-dependent photon generation schedule may comprise electronic information indicative of instructions to generate a first subseries of photons for a first number of photons (e.g., a first 2 photons), a second subseries of photons for a second number of photons (e.g., the next 5 photons), a third subseries of photons for a third number of photons (e.g., the next 3 photons), and a fourth subseries of photons during for a fourth number of photons (e.g., the next 2 photons), after which the unit-dependent photon generation schedule may repeat.

In some embodiments, the qubit decoder 116, the central management device 112, or both may be configured to generate a unit-dependent decoding schedule. In some instances, the central management device 112 may be further configured to transmit the unit-dependent decoding schedule to the qubit decoder 116. The qubit decoder 116 may be configured to receive the unit-dependent decoding schedule and decode a received series of photons based on the unit-dependent decoding schedule to generate a set of bits. For example, an example unit-dependent decoding schedule may comprise electronic information indicative of instructions to decode photons based on a diagonal basis for a first number of bits (e.g., a first 2 bits), a rectilinear basis for a second number of bits (e.g., the next 4 bits), and a circular basis during for a third number of bits (e.g., the next 2 bits), after which the unit-dependent decoding schedule may repeat. Other encoding and decoding patterns may be utilized as well without departing from the scope of the present disclosure.

In some embodiments, the qubit decoder 116, the central management device 112, or both may determine a set of quantum bases for use by the qubit decoder 116 using a pseudo-random quantum basis selection technique. For example, the qubit decoder 116 may itself select a set of quantum bases for use and may utilize that selected set of quantum bases without ever transmitting information about the selected set of quantum bases to any other device. In another example, the central management device 112 may determine a set of quantum bases for use by the qubit decoder 116 using a pseudo-random quantum basis selection technique, and both the central management device 112 and the qubit decoder 116 may never thereafter transmit information about the selected set of quantum bases.

By way of example, in some embodiments, the selection of an appropriate set of quantum bases may utilize a frequency calculation procedure in which a selection frequency for each quantum basis may be monitored such that the likelihood that an unselected quantum basis is selected during subsequent selections is increased until an unselected quantum basis is selected. Said differently, in an instance in which a first quantum basis is initially selected, the remaining quantum bases may be weighted such that selection of these quantum bases on subsequent selections operations is more likely as compared to the first quantum basis. Once these remaining quantum bases are selected in the future, however, their corresponding weighting may decrease relative to still other unselected quantum bases. To duplicate this pseudo-random quantum basis selection technique, an intruder would need to have insight into multiple different iterations of the pseudo-random number generation process, and even then would need to deduce the weighting scheme. While a frequency calculation procedure is outlined above for selection of a set of quantum bases for the laser device 114 or the qubit decoder 116, the present disclosure contemplates that any known pseudo-random number generation algorithm (e.g., a middle-square method, mersenne twister, inversive congruential generator, lagged Fibonacci generator, linear feedback shift register or the like) may additionally or alternatively be used to pseudo-randomly select the set of quantum bases for the qubit decoder 116 without departing from the scope of the disclosure.

In some embodiments, the laser device 114 may comprise photonic generation circuitry configured to generate photon pulses and transmit the generated photon pulses over an optical line 118, wherein the photons are not polarized. For example, a modulating circuit built into the laser device 114 may modulate a laser to generate a series of photons. In some embodiments, an attenuator or deflector may be positioned between the laser device 114 and the qubit decoder 116 to reduce the beam to a single photon pulse and transmit single photons to the qubit decoder 116. The qubit decoder 116 may measure the polarization of photons using a determined set of quantum bases or, in some instances, an arbitrary quantum basis. For a completely unpolarized state, the qubits will set to one and zero with a probability of fifty percent. In other embodiments, the combination of laser device 114 with an attenuator or deflector may be replaced by a single photon source and thus the single photon polarization state may be measured at the qubit decoder 116. A bit manipulator circuit comprised by, or communicatively coupled to, the qubit decoder 116 may convert the qubit measurement into a stream of classical bits.

In some embodiments, a cloud-based light source along with a modulating circuit may be offered as a service. The service may be provided to any server farm having a qubit decoder 116. The qubit decoder 116 may serve a plurality of session authentication system server devices 104, and the light source may serve a plurality of server farms.

In some embodiments, the qubit decoder 116 may be configured to receive a series of photons while they are not in a well-defined quantum state. The series of photons may comprise a series of non-polarized photons. A non-polarized photon may comprise, for example, a photon whose polarization has not been measured. In some embodiments, the qubit decoder 116 may be configured to receive the series of photons over a non-polarization maintaining optical fiber. So long as the photon pulses from the light source (e.g., laser device 114) are not in a well-defined quantum state when they arrive at the qubit decoder 116, the decoded qubits will have inherent randomness regardless of the quantum basis with which they are measured. For instance, the use of normal fiber (not polarization maintaining fiber) for optical line 118 may ensure that polarization states are not maintained even the photons coming out the light source have a certain degree of polarization. In addition, another benefit of the present embodiments is the fact that the light source need not be a polarized light source, and any other optical components such as repeaters or switches need not be polarization maintaining components.

Example Implementing Apparatuses

The example environments described with reference to FIGS. 1A-1D may be embodied by one or more computing systems, such as: apparatus 200 shown in FIG. 2A, which represents an example session authentication system 102, a session authentication system server device 104, or both; apparatus 220 shown in FIG. 2B, which represents an example client device 110; apparatus 240 shown in FIG. 2C, which represents an example central management device 112; apparatus 260 shown in FIG. 2D, which represents an example laser device 114; apparatus 270 shown in FIG. 2E, which represents an example switching device 122; and apparatus 280 shown in FIG. 2F, which represents an example qubit decoder 116. As noted previously, it will be appreciated that in some embodiments, one or more of the apparatuses described in connection with FIGS. 2A-2F may be components of another of these apparatuses (as one example, the apparatus 240, representing a central management device 112, may in some embodiments be a component of apparatus 200, which represents an example of the session authentication system 102; as another example, apparatus 260, which represents a laser device 114, may in some embodiments be a component of apparatus 240, which represents the central management device 112; and as yet another example, apparatus 280, which represents a qubit decoder 116, may in some embodiments be a component of apparatus 200, which, as noted above, represents an example session authentication system 102).

Figure 2A:
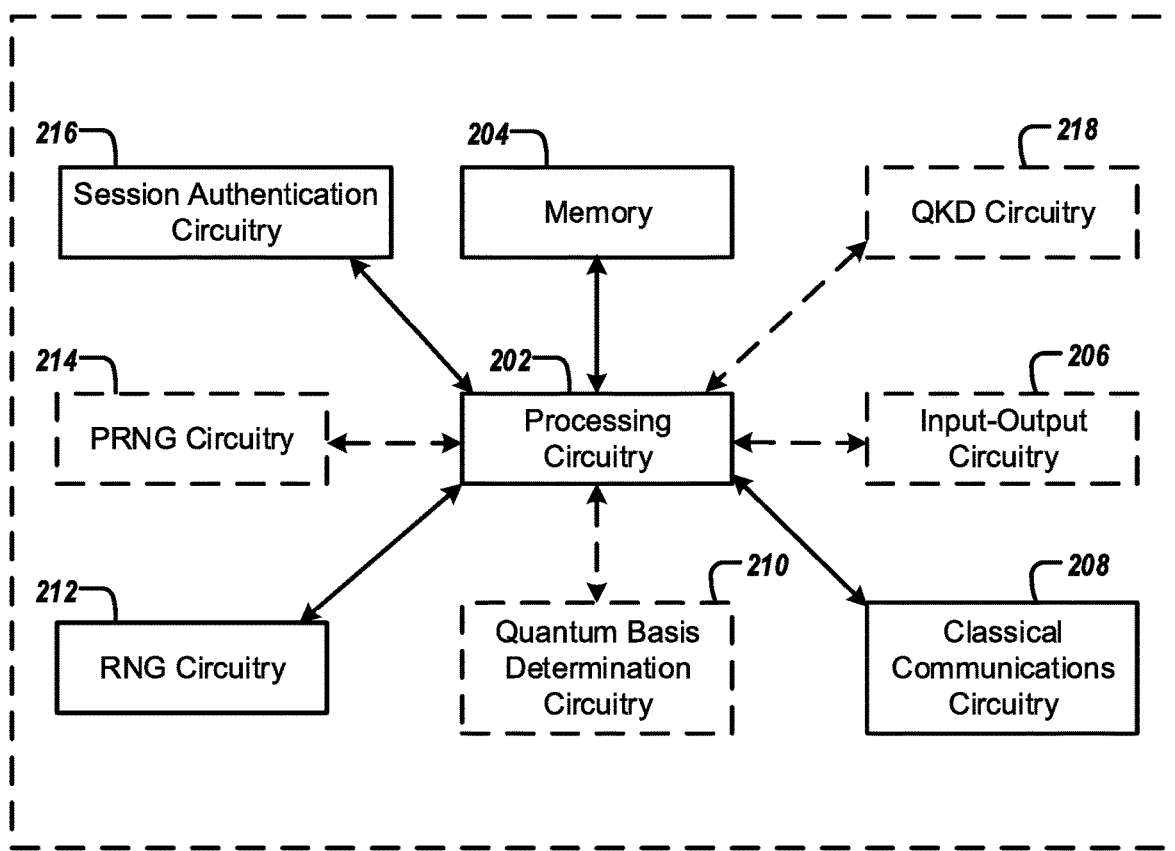
FIGS. 2A, 2B, 2C, 2D, 2E, and 2F illustrate schematic block diagrams of example circuitry that may perform various operations in accordance with some example embodiments described herein.

As illustrated in FIG. 2A, the apparatus 200, representing an example session authentication system 102 (or, in some instances, a session authentication system server device 104 resident within a session authentication system 102), may include processing circuitry 202, memory 204, input-output circuitry 206, classical communications circuitry 208, quantum basis determination circuitry 210, random number generation (RNG) circuitry 212, pseudo-random number generation (PRNG) circuitry 214, session authentication circuitry 216, and quantum key distribution (QKD) circuitry 218. The apparatus 200 may be configured to execute various operations described above with respect to FIGS. 1A-1D and below with respect to FIGS. 3-4.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure. For example, the memory 204 may be configured to store data, control signals, electronic information, and, in some instances, encoding and decoding schedules. It will be understood that the memory 204 may be configured to store any electronic information, data, control signals, schedules, links, pointers, databases, tables, maps, embodiments, examples, figures, techniques, processes, operations, techniques, methods, systems, apparatuses, or computer program products described herein, or any combination thereof. The memory 204 may, in this regard, host components such as one or more session authentication system databases 106, described with reference to FIGS. 1A-1D.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed. In some embodiments, the processing circuitry 202 includes hardware components designed or configured to generate a photonic control signal indicative of an instruction to generate a series of photons.

In some embodiments, the apparatus 200 may include input-output circuitry 206 that may, in turn, be in communication with processing circuitry 202 to provide output to the user and, in some embodiments, to receive an indication of a user input such as a set of bits, a control signal (e.g., a control signal indicative of a quantum basis or set of quantum bases; a control signal indicative of an instruction to decode photons according to a particular quantum basis or set of quantum bases), or a schedule (e.g., a time-dependent photon generation schedule, time-dependent decoding schedule, a unit-dependent photon generation schedule, or a unit-dependent decoding schedule) provided by a user. The input-output circuitry 206 may comprise a user interface and may include a display that may include a web user interface, a mobile application, a client device, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate electronic content for display by one or more other devices with which one or more users directly interact and classical communications circuitry 208 of the apparatus 200 may be leveraged to transmit the generated electronic content to one or more of those devices.

The classical communications circuitry 208 may be any device or circuitry embodied in either hardware or a combination of hardware and software that is configured to receive and/or transmit data from or to a network and/or any other device, circuitry, or module in communication with the apparatus 200. In this regard, the classical communications circuitry 208 may include, for example, a network interface for enabling communications with a wired or wireless communications network. For example, the classical communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The quantum basis determination circuitry 210 includes hardware components designed or configured to determine, select, choose, or identify a quantum basis or set of quantum bases for decoding photons. It will be understood that the terms "determine," "determining," and "determining," as recited throughout this disclosure, broadly and respectively encompass the terms generate, generating, and generation. Subsequently, the quantum basis determination circuitry 210 may never thereafter transmit information about the determined set of quantum bases, except as necessary for instruction of a corresponding qubit decoder 116.

In some embodiments, the quantum basis determination circuitry 210 includes hardware components designed or configured to generate a control signal indicative of the determined set of quantum bases (or, in some instances, an instruction to decode photons based on the determined set of quantum bases). In some embodiments, the control signal may comprise one or more links or pointers to the determined set of quantum bases contained in the database of quantum bases.

In some embodiments, the quantum basis determination circuitry 210 includes hardware components designed or configured to generate: a time-dependent photon generation schedule; a time-dependent decoding schedule comprising a plurality of quantum bases respectively corresponding to a plurality of time periods; or both. In some embodiments, the photonic generation circuitry 224 may be configured to generate the series of photons based on the time-dependent photon generation schedule. In some embodiments, the decoding circuitry 226 may configured to decode the series of photons based on the time-dependent decoding schedule to generate the decoded set of bits.

In some embodiments, the quantum basis determination circuitry 210 includes hardware components designed or configured to generate: a unit-dependent photon generation schedule; a unit-dependent decoding schedule comprising a plurality of quantum bases respectively corresponding to a plurality of numbers of bits; or both. In some embodiments, the photonic generation circuitry 224 may be configured to generate the series of photons based on the unit-dependent photon generation schedule. In some embodiments, the decoding circuitry 226 may configured to decode the series of photons based on the unit-dependent decoding schedule to generate the decoded set of bits.

In some embodiments, the quantum basis determination circuitry 210 includes hardware components designed or configured to determine the set of quantum bases using the pseudo-random quantum basis selection technique. In some embodiments, the pseudo-random quantum basis selection technique may comprise a frequency calculation procedure.

In some embodiments, the session authentication system 102 may comprise multiple quantum basis determination circuitries 210, such as: one embodied by central management device 112; one embodied by each laser device 114A-114N; one embodied by each qubit decoder 116A-116N; one that controls quantum basis determination for laser device 114 and another that controls quantum basis determination for qubit decoders 116A-116N; or multiple quantum basis determination circuitries corresponding to any other suitable arrangement.

The hardware components comprising the quantum basis determination circuitry 210 may, for instance, utilize processing circuitry 202 to perform various computing operations and may utilize memory 204 for storage of data or electronic information received or generated by the quantum basis determination circuitry 210. The hardware components may further utilize classical communications circuitry 208 or any other suitable wired or wireless communications path to communicate with a central management device 112, a qubit decoder 116, or any other suitable circuitry or device described herein.

The RNG circuitry 212 includes hardware components designed or configured to generate a number based on a set of bits generated by a qubit decoder 116. For example, the generated number may be an actual set of bits generated by the qubit decoder 116, a number that includes the set of bits in its entirety, a number that includes only "error" bits for which a quantum basis used for encoding of a qubit differs from a quantum basis used for decoding of the qubit, or any other suitable number. These hardware components may, for instance, utilize processing circuitry 202 to perform various computing operations and may utilize memory 204 for storage of data or electronic information received or generated by the RNG circuitry 212. The hardware components may further utilize classical communications circuitry 208, or any other suitable wired or wireless communications path to communicate with a qubit decoder 116 or any other suitable circuitry or device described herein.

The PRNG circuitry 214 includes hardware components designed or configured to receive a seed for pseudo-random number generation based on the number generated by the RNG circuitry 212 and then generate a pseudo-random number based on the seed. These hardware components may, for instance, utilize processing circuitry 202 to perform various computing operations and may utilize memory 204 for storage of data or electronic information received or generated by the PRNG circuitry 214.

The session authentication circuitry 216 includes hardware components designed or configured to generate a session ID (e.g., a session key) based on a number generated by the RNG circuitry 212, a pseudo-random number generated by the PRNG circuitry 214, or both. For example, the session authentication circuitry 216 may receive the pseudo-random number from the PRNG circuitry 214 and use the received pseudo-random number as the session key. In another example, the session authentication circuitry 216 may receive the generated number from the RNG circuitry 212 and use the generated number as the session key. In yet another example, the session authentication circuitry 216 may perform a further transformation on a number generated by the RNG circuitry 212 or a pseudo-random number generated by the PRNG circuitry 214 (e.g., a convolution of the number or pseudo-random number with an independent variable, such as an internal clock time measured by the apparatus 200), and thereafter use the result of the further transformation as the session key. In some embodiments, the session authentication circuitry 216 may be further configured to generate the session key by (i) setting the session key equal to a generated number (e.g., a number generated by the RNG circuitry 214 or the PRNG circuitry 216 based on the decoded set of bits), or (ii) using the generated number as a seed in a pseudo-random number generation procedure, wherein an output of the pseudo-random number generation procedure comprises the session key. Following generation of the session key, the session authentication circuitry 216 may transmit the session key to a client device 110 (and in one such embodiment, the session authentication circuitry 216 may cause QKD circuitry 218 to perform quantum key distribution of the session key to securely transmit the session key).

In some embodiments, where the RNG circuitry 212 includes hardware components designed or configured to generate a number based on a decoded set of bits, the session authentication circuitry 216 includes hardware components designed or configured to generate the session key by: (i) setting the session key equal to the generated number; or (ii) using the generated number as a seed in a pseudo-random number generation procedure, wherein an output of the pseudo-random number generation procedure comprises the session key.

In some embodiments, the session authentication circuitry 216 includes hardware components designed or configured to subsequently authenticate a session between two or more devices. In some instances, the session authentication circuitry 216 may use the generated session key to authenticate a session on behalf of a server device (e.g., a session authentication system server device 104) and at the request of a client device 110. For example, the session authentication circuitry 216 may use a generated first session key to authenticate a first session on behalf of a session authentication system server device 104A and at the request of one of client devices 110A-110N. In another example, the session authentication circuitry 216 may use a generated second session key to authenticate a second session between two other devices, such as session authentication system server device 104B and at the request of another of the client devices 110A-110N. In some instances, the session authentication circuitry 216 may receive a key from the client device 110, and then compare the received key to the generated session key to determine if a match is found. If so, the session authentication circuitry 216 may transmit a communication to the server device comprising a validation of the session key received from the client device 110. If not, then the session authentication circuitry 216 may transmit a communication to the server device indicating a validation failure. The hardware components comprising the session authentication circuitry 216 may, for instance, utilize processing circuitry 202 to perform various computing operations and may utilize memory 204 for storage of data or electronic information received or generated by the session authentication circuitry 216. The hardware components may further utilize classical communications circuitry 208, or any other suitable wired or wireless communications path to communicate with a remote server device or a client device 110, or any other suitable circuitry or device described herein.

The QKD circuitry 218 includes hardware components designed or configured to perform quantum key distribution of a session key generated by the session authentication circuitry 216. These hardware components may, for instance, utilize processing circuitry 202 to perform various computing operations and may utilize memory 204 for storage of data or electronic information received or generated by the QKD circuitry 218. The hardware components may further utilize classical communications circuitry 208, or any other suitable wired or wireless communications path to communicate with a client device 110 to distribute a session ID to the client device 110, or with any other suitable circuitry or device described herein.

Figure 2B:
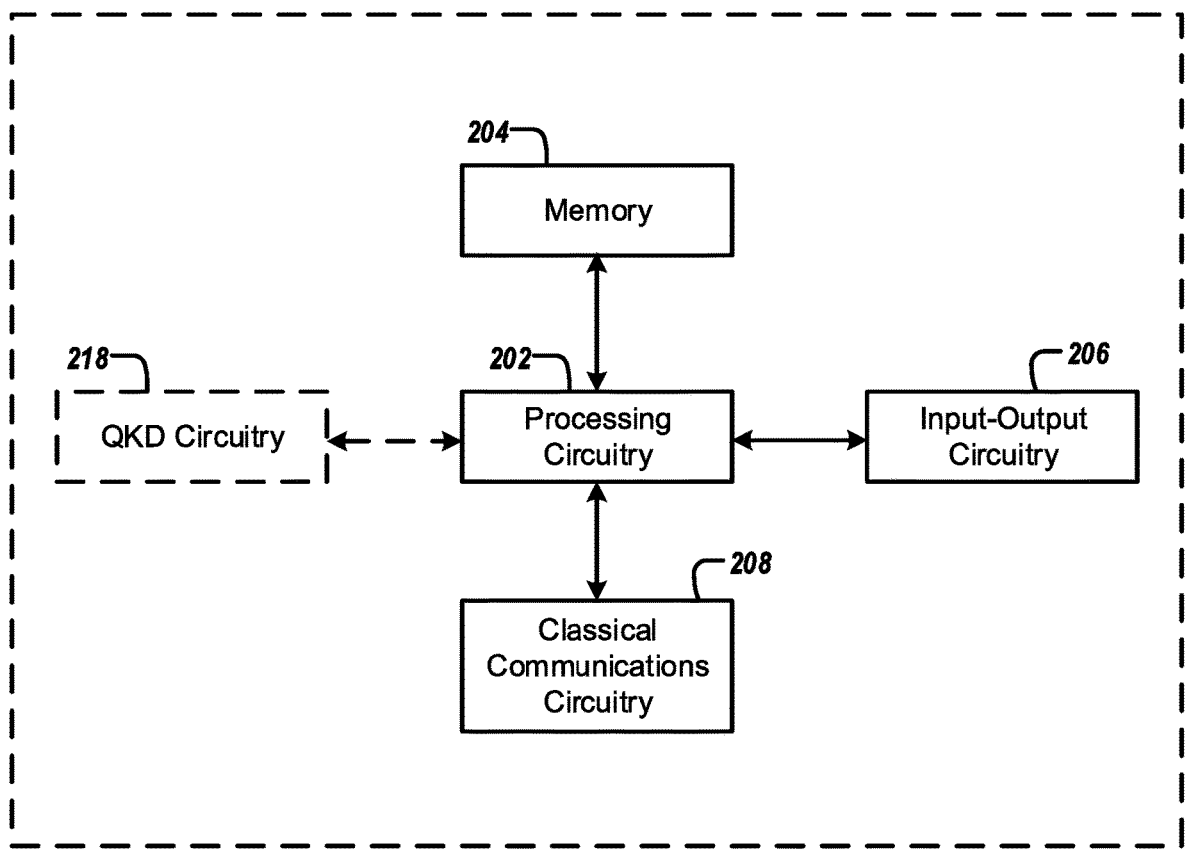

As illustrated in FIG. 2B, an apparatus 220 is shown that represents an example client device 110. The apparatus 220 includes processing circuitry 202, memory 204, input-output circuitry 206, and classical communications circuitry 208, and may optionally include QKD circuitry 218, as described above in connection with FIG. 2A. It will be appreciated that QKD circuitry 218 is an optional component of the apparatus 220 insofar as it is only required if a session ID (e.g., session key) is distributed from the session authentication system 102 to the client device 110 via a QKD procedure (other key distribution techniques may alternatively be used). It will be understood, however, that additional components providing additional functionality may be included in the apparatus 220 without departing from the scope of the present disclosure. The apparatus 220 may be involved in execution of various operations described above with respect to FIGS. 1A-1D and below with respect to FIGS. 3-4.

Figure 2C:
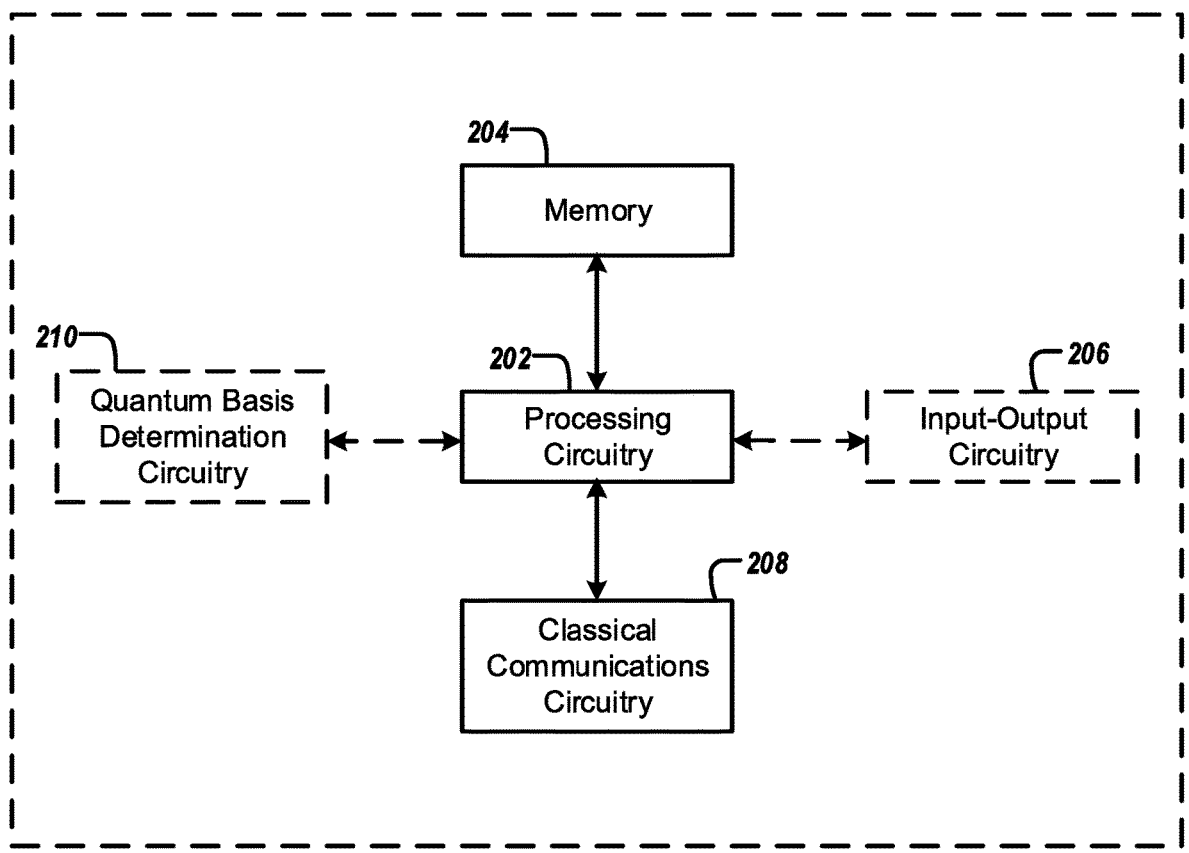

As illustrated in FIG. 2C, an apparatus 240 is shown that represents an example central management device 112. The apparatus 240 includes processing circuitry 202, memory 204, and classical communications circuitry 208, and may optionally include input-output circuitry 206, as described above in connection with FIG. 2A. Input-output circuitry 206 is optional in apparatus 240 insofar as it is only required in embodiments where a user directly interacts with the apparatus 240 to provide information needed for quantum basis determination for a laser device 114 communicatively connected to the central management device 112. To this end, the apparatus 240 may also include quantum basis determination circuitry 210, as described above in connection with FIG. 2A, for the purpose of selecting an appropriate quantum basis for the laser device 114.

The apparatus 240 may be configured to execute various operations described above with respect to FIGS. 1A-1D and below with respect to FIGS. 3-4. It will be understood, however, that additional components providing additional functionality may be included in the apparatus 240 without departing from the scope of the present disclosure. Moreover, as noted previously, in some embodiments the central management device 112 comprises a component of session authentication system 102, and in such embodiments, the components described herein in connection with apparatus 240 shall be understood as comprising components of an apparatus 200 representing a corresponding session authentication system 102 (or a constituent session authentication system server device 104 thereof).

Figure 2D:
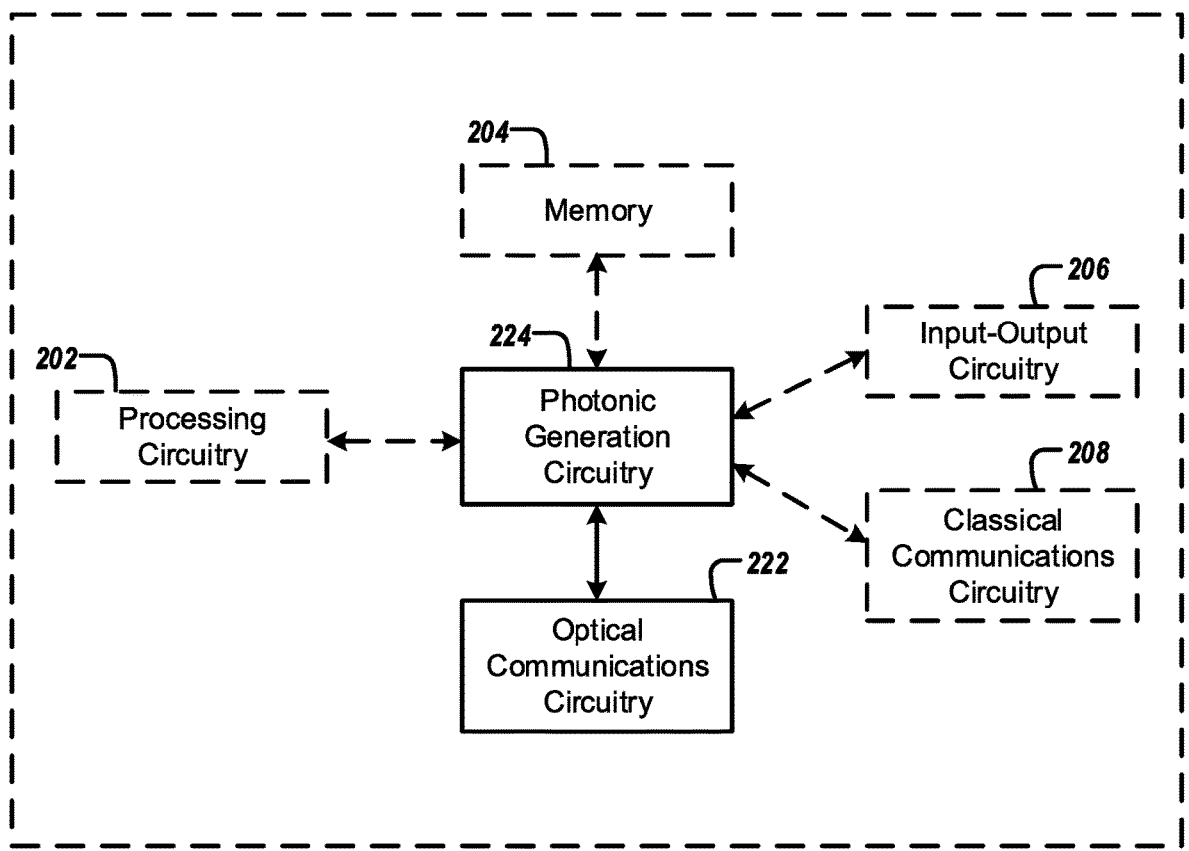

As illustrated in FIG. 2D, an apparatus 260 is shown that represents an example laser device 114. The apparatus 260 includes classical communications circuitry 208, as described above in connection with FIG. 2A. The apparatus 260 additionally includes optical communications circuitry 222 to transmit a series of photons to a qubit decoder, and photonic generation circuitry 224 to generate the series of photons to be transmitted. In addition, the apparatus 260 may further include processing circuitry 202 and a memory 204 to facilitate operation of photonic generation circuitry 224.

The optical communications circuitry 222 may be any device or circuitry embodied in either hardware or a combination of hardware and software that is configured to receive and/or transmit photons from or to any other device, circuitry, or module in communication with the apparatus 260. In this regard, the optical communications circuitry 222 may include, for example, an optical communications interface for enabling optical communications over an optical line (e.g., optical line 118 shown in FIGS. 1A-1D).

The photonic generation circuitry 224 includes hardware components designed or configured to generate a series of photons and transmit, directly or indirectly, the series of photons to the decoding circuitry 226. The photonic generation circuitry 224 may comprise various optoelectronic components, such as those described previously (including, but not limited to a light source, a cloud-based light source, a single photon source, a laser, a modulating circuit, an attenuator, a deflector, or a combination thereof). In some embodiments, the photonic generation circuitry 224 may include additional hardware components designed or configured to generate photons based on a time-dependent photon generation schedule. Similarly, the photonic generation circuitry 224 may include additional hardware components designed or configured to generate photons based on a unit-dependent photon generation schedule. These hardware components may, for instance, comprise processing circuitry 202 to perform various computing operations and a memory 204 for storage of data or electronic information received or generated by the photonic generation circuitry 224. The hardware components may further utilize classical communications circuitry 208 to communicate with a server device (e.g., a central management device 112 or session authentication system server device 104), or any other suitable circuitry or device described herein.

In some embodiments, the photonic generation circuitry 224 may include additional or alternate hardware components designed or configured to generate the series of photons. For example, the photonic generation circuitry 224 may comprise a laser configured to generate light and an attenuator or deflector, wherein the attenuator or deflector is configured to transform the generated light into the series of photons. In another example, the photonic generation circuitry 224 may comprise a single photon source configured to generate the series of photons. In yet another example, the photonic generation circuitry 224 may comprise a modulating circuit configured to generate the series of photons.

The apparatus 260 may be configured to execute various operations described above with respect to FIGS. 1A-1D and below with respect to FIGS. 3-4. It will be understood, however, that additional components providing additional functionality may be included in the apparatus 260 without departing from the scope of the present disclosure. Moreover, as noted previously, in some embodiments the laser device 114 comprises a component of a central management device 112, and in such embodiments, the components described herein in connection with apparatus 260 shall be understood as comprising components of an apparatus 240 representing a corresponding central management device 112 (or, by extension, of a session authentication system 102 (or a constituent session authentication system server device 104 thereof) in embodiments in which the central management device 112 itself comprises a component of one of those devices).

Figure 2E:
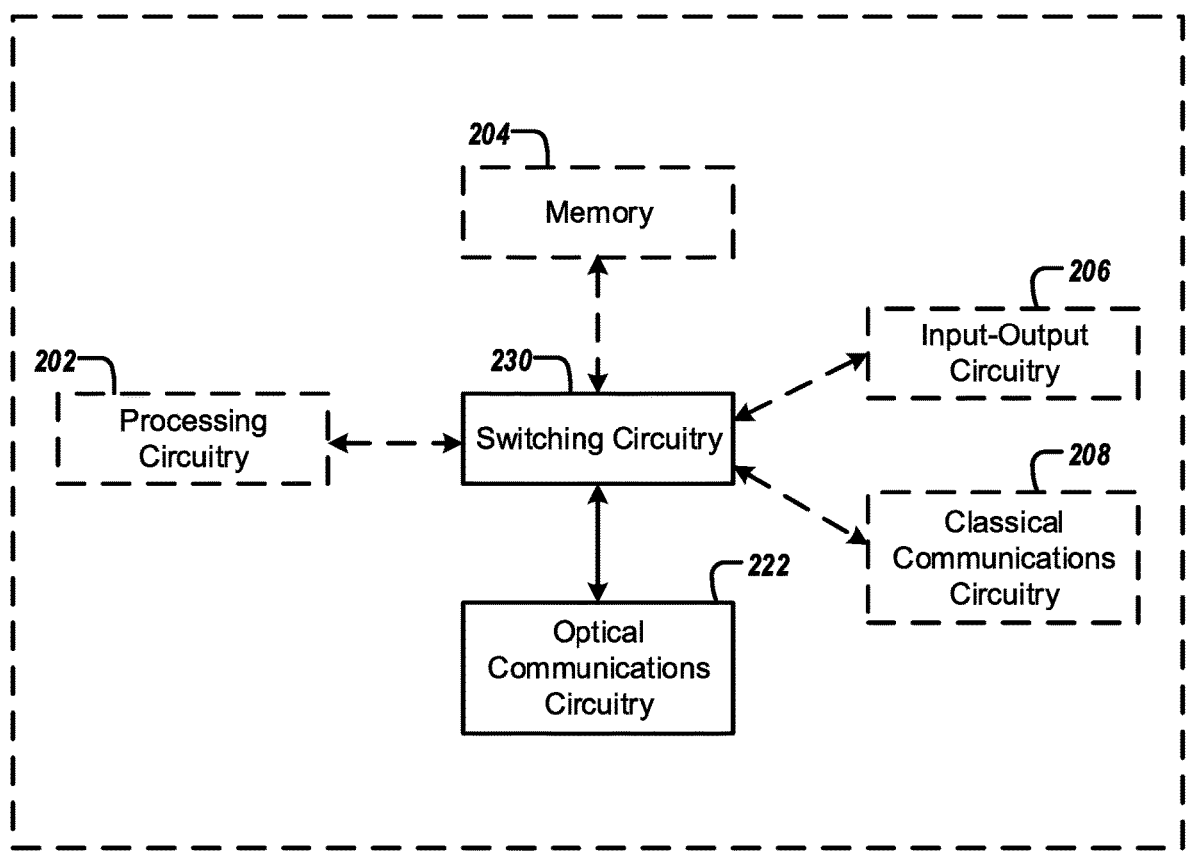

As illustrated in FIG. 2E, an apparatus 270 is shown that represents an example switching device 122. The apparatus 270 includes classical communications circuitry 208, as described above in connection with FIG. 2A. The apparatus 260 additionally includes optical communications circuitry 222 to receive series of photons from a laser device (or, in some instances, from another switching device) and to transmit sets or subseries of photons to qubit decoders (or, in some instances, to another switching device). The apparatus 260 additionally includes switching circuitry 230 to perform the switching operations described herein. In addition, the apparatus 270 may further include processing circuitry 202 and a memory 204 to facilitate operation of switching circuitry 230.

The switching circuitry 230 includes hardware components designed or configured to transmit photons received from the photonic generation circuitry 224 (e.g., a laser device 114), or from another switching circuitry (e.g., one or more additional switching devices 122), to one or more decoding circuitries 226 (e.g., one or more of qubit decoders 116A-116N). For example, the switching circuitry 230 may transmit a first subseries of photons received from the photonic generation circuitry 224 to a first decoding circuitry 226 (e.g., qubit decoder 116A). In another example, the switching circuitry 230 may transmit a second subseries of photons received from the photonic generation circuitry 224 to a second decoding circuitry 226 (e.g., qubit decoder 116B). These hardware components may utilize optical communications circuitry 222 to communicate with the photonic generation circuitry 224 (e.g., a laser device 114), another switching circuitry (e.g., one or more additional switching devices 122), decoding circuitry 226 (e.g., one or more of qubit decoders 116A-116N), or any other suitable circuitry or device described herein.

Figure 2F:
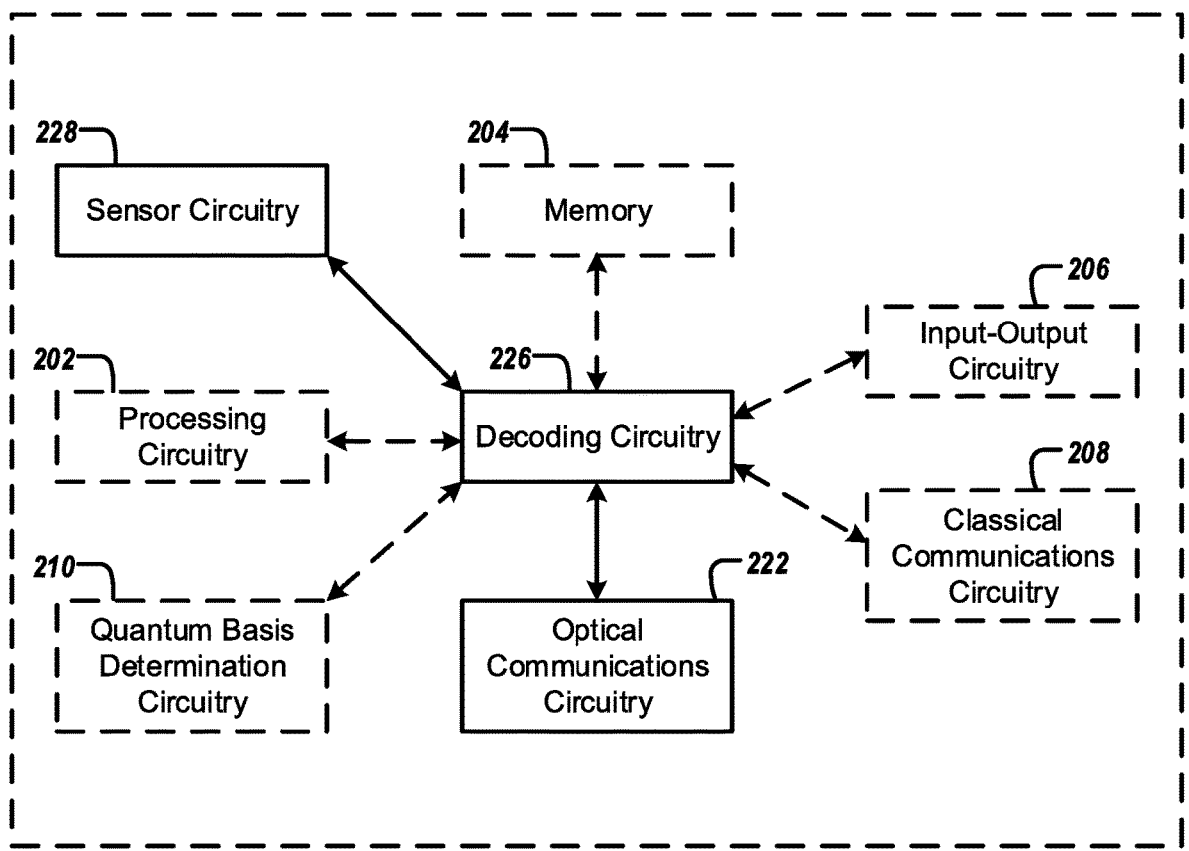

As illustrated in FIG. 2F, an apparatus 280 is shown that represents an example qubit decoder. The apparatus 280 includes classical communications circuitry 208 and optical communications circuitry 222, as described above in connection with FIG. 2D, and additionally includes decoding circuitry 226 to decode a series of photons received from a laser device. Furthermore, in similar fashion as described above in connection with FIG. 2D, the apparatus 280 may further optionally include processing circuitry 202 and a memory 204 to facilitate operation of decoding circuitry 226, and may include quantum basis determination circuitry 210 in some embodiments where the quantum basis, or set of quantum bases, selected for decoding of a given set of bits is determined by the apparatus 280 and not by a separate session authentication system 102.

The decoding circuitry 226 includes hardware components designed or configured to generate a set of bits by decoding the series of photons received from a laser device 114 based on a set of quantum bases. The decoding circuitry 226 may comprise various optoelectronic components, such as those described previously (including, but not limited to, a bit manipulator circuit configured to convert the qubit measurement into a stream of classical bits). In some embodiments, the decoding circuitry 226 may use N quantum bases for decoding the photons, where N represents an integer greater than or equal to one. In some embodiments, the decoding circuitry 226 may be configured to not transmit electronic information indicative of the determined set of quantum bases. In some embodiments, the decoding circuitry 226 includes hardware components designed or configured to receive a control signal indicative of an instruction to initiate decoding based on the set of quantum bases and, in response to receiving the control signal, decode the series of photons based on the set of quantum bases.

In some embodiments, the decoding circuitry 226 includes hardware components designed or configured to determine a set of quantum bases to use for measurement, receive a series of photons, and decode the series of photons based on the determined set of quantum bases to generate a decoded set of bits. In some embodiments, the decoding circuitry 226 includes hardware components designed or configured to receive the series of photons while they are not in a well-defined quantum state. The series of photons may comprise a series of non-polarized photons. A non-polarized photon may comprise, for example, a photon whose polarization has not been measured. In some embodiments, the decoding circuitry 226 includes hardware components designed or configured to receive the series of photons over a non-polarization maintaining optical fiber.

In some embodiments, the decoding circuitry 226 may comprise a bit manipulator circuit. The decoding circuitry 226 includes hardware components designed or configured to decode the series of photons by measuring a polarization of the series of photons using the determined set of quantum bases. The bit manipulator circuit includes hardware components designed or configured to convert the measured polarization of the series of photons into the decoded set of bits.

In some embodiments, the decoding circuitry 226 may include additional hardware components designed or configured to decode photons based on a time-dependent decoding schedule comprising a plurality of quantum bases respectively corresponding to a plurality of time periods. As another example, in some embodiments, the decoding circuitry 226 may include additional hardware components designed or configured to decode photons based on a unit-dependent decoding schedule comprising a plurality of quantum bases respectively corresponding to a plurality of numbers of bits to be decoded. These hardware components comprising the decoding circuitry 226 may, for instance, comprise processing circuitry 202 to perform various computing operations and a memory 204 for storage of data or electronic information received or generated by the decoding circuitry 226. These hardware components may further comprise classical communications circuitry 208, optical communications circuitry 222, or any suitable wired or wireless communications path to communicate with a server device (e.g., one or more session authentication system server devices 104) a laser device 114, or any other suitable circuitry or device described herein. In some instances, the decoding circuitry 226 may decode the series of photons by measuring the series of photons using sensor circuitry 228.

The sensor circuitry 228 includes hardware components designed or configured to measure received photons. For example, the sensor circuitry 228 may comprise one or more sensors such as photodetectors, photodiodes, cameras, or any other suitable devices or optoelectronic components. These hardware components may, for instance, utilize processing circuitry 202 to perform various computing operations and may utilize memory 204 for storage of data or electronic information received or generated by the sensor circuitry 228.

The apparatus 280 may be configured to execute various operations described above with respect to FIGS. 1A-1D and below with respect to FIGS. 3-4. It will be understood, however, that additional components providing additional functionality may be included in the apparatus 280 without departing from the scope of the present disclosure. Moreover, as noted previously, in some embodiments the qubit decoder 116 comprises a component of a session authentication system 102, and in such embodiments, the components described herein in connection with apparatus 280 shall be understood as comprising components of an apparatus 200 representing a corresponding session authentication system 102 (or a constituent session authentication system server device 104 thereof).

Although some of these components of apparatuses 200, 220, 240, 260, 270, and 280 are described with respect to their functional capabilities, it should be understood that the particular implementations necessarily include the use of particular hardware to implement such functional capabilities. It should also be understood that certain of these components may include similar or common hardware. For example, two sets of circuitry may both leverage use of the same processor, network interface, optical communications interface, optoelectronic components, storage medium, or the like to perform their associated functions, such that duplicate hardware is not required for each set of circuitry. It should also be appreciated that, in some embodiments, one or more of these components may include a separate processor, specially configured field programmable gate array (FPGA), application specific interface circuit (ASIC), or cloud utility to perform its corresponding functions as described herein.

The use of the term "circuitry" as used herein with respect to components of apparatuses 200, 220, 240, 260, 270, and 280 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, optical communications interfaces, input-output devices, optoelectronic components, and other components. In some embodiments, other elements of apparatuses 200, 220, 240, 260, 270, and 280 may provide or supplement the functionality of particular circuitry. For example, the processing circuitry 202 may provide processing functionality, memory 204 may provide storage functionality, and classical communications circuitry 208 may provide network interface functionality, among other features.

In some embodiments, various components of one or more of the apparatuses 200, 220, 240, 260, 270, or 280 may be hosted remotely (e.g., by one or more cloud servers) and thus need not physically reside on the corresponding apparatus 200, 220, 240, 260, 270, or 280. Thus, some or all of the functionality described herein may be provided by third party circuitry. For example, a given apparatus 200, 220, 240, 260, 270, or 280 may access one or more third party circuitries via any sort of networked connection that facilitates transmission of data and electronic information between the apparatus 200, 220, 240, 260, 270, or 280 and the third party circuitries. In turn, that apparatus 200, 220, 240, 260, 270, or 280 may be in remote communication with one or more of the other components describe above as comprising the apparatus 200, 220, 240, 260, 270, or 280.

As will be appreciated, computer program instructions and/or other type of code may be loaded onto a computer, processor or other programmable apparatus's circuitry to produce a machine, such that the computer, processor, or other programmable circuitry that executes the code on the machine creates the means for implementing various functions described herein.

As described above and as will be appreciated based on this disclosure, embodiments of the present disclosure may be configured as systems, apparatuses, methods, optoelectronic devices, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 3A:
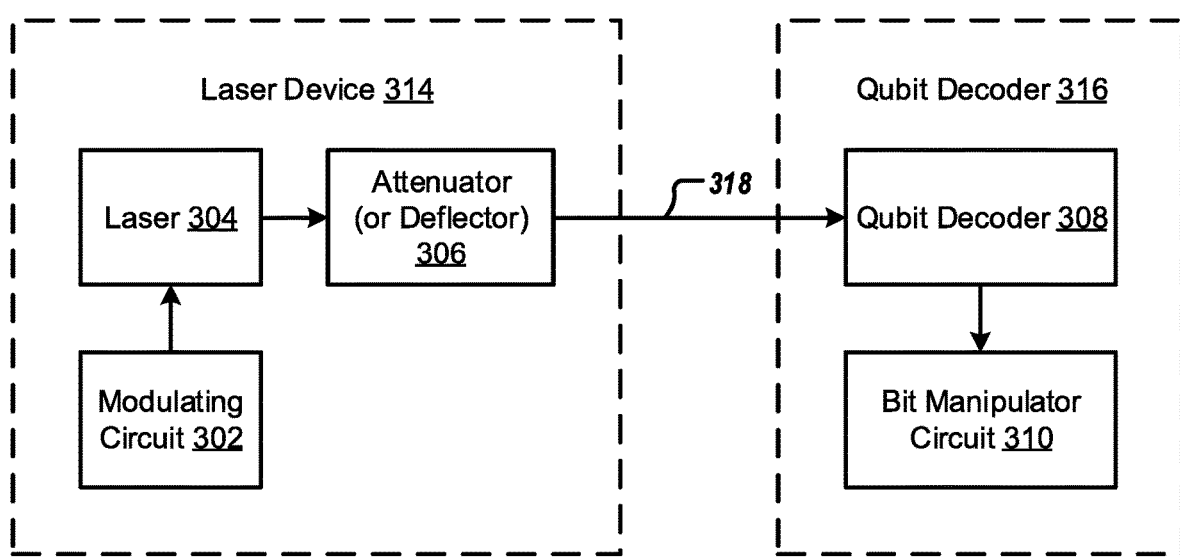
FIGS. 3A and 3B illustrate system diagrams of sets of laser devices and qubit decoders that may be involved in some example embodiments described herein.
Figure 3B:
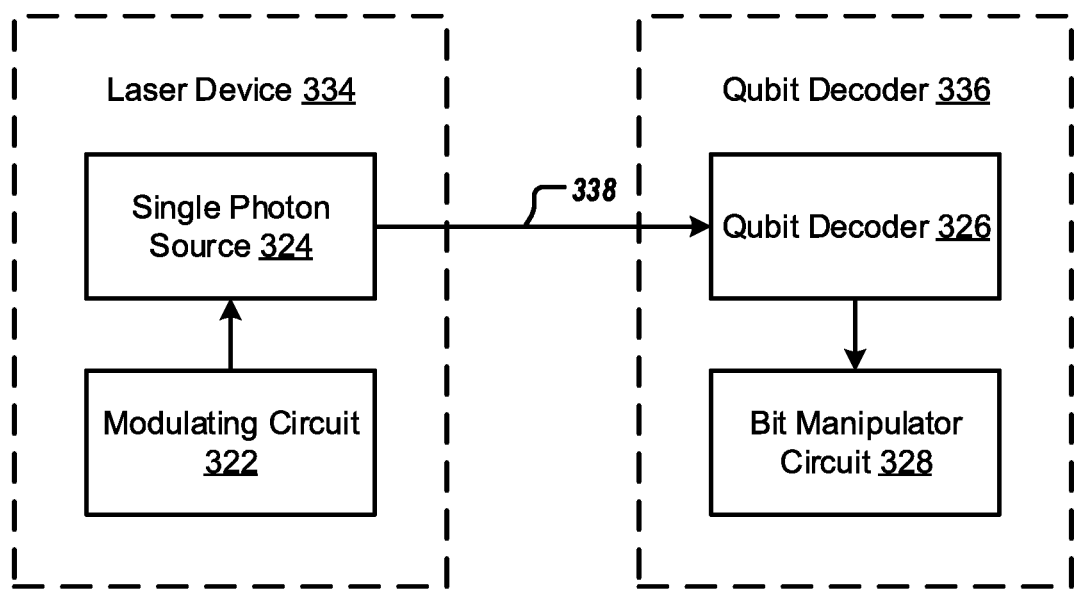

FIGS. 3A and 3B illustrate system diagrams of sets of laser devices and qubit decoders that may be involved in some example embodiments described herein.

In one example embodiment, as shown in FIG. 3A, a laser device 314 may comprise a modulating circuit 302, a laser 304, and an attenuator (or deflector) 306. In some embodiments, laser 304 may be an edge-emitting laser. In other embodiments, laser 304 may be a fiberoptic laser with a polarizing component, a VCSEL, a PLM, or any other suitable laser or device. In some embodiments, modulating circuit 302 may be configured to modulate the laser 304, and the laser 304 may be configured to produce pulses of photons. The laser 304 may be coupled to an attenuator (or deflector) 306 to reduce the intensity of the photon pulses to about one photon per pulse and thereby transmit single photons to a qubit decoder 316. In some embodiments, the laser 304 may generate a series of photons in the infrared or near-infrared range (e.g., 1550 nanometers (nm), 980 nm, 900 nm). The laser device 314 may be optically coupled to the qubit decoder 316 through an optical line 318. The qubit decoder 316 may comprise a qubit decoder 308 and a bit manipulator circuit 310. The qubit decoder 308 may comprise, or be, a polarimeter configured to measure the polarization of photons in a determined set of quantum bases or, in some instances, an arbitrary quantum basis. For instance, in the case of a completely unpolarized state, qubit decoder 308 may set the qubits to one and zero with a probability of fifty percent. A bit manipulator circuit 310 comprised by, or communicatively coupled to, the qubit decoder 308 may convert the qubit measurement into a stream of classical bits.

In another example embodiment, as shown in FIG. 3B, a laser device 334 may comprise a modulating circuit 322 and a single photon source 324. The laser device 334 may be optically coupled to a qubit decoder 336 through an optical line 338. The qubit decoder 336 may comprise a qubit decoder 326 (e.g., a polarimeter) and a bit manipulator circuit 328. In some embodiments, modulating circuit 322 may be configured to modulate the single photon source 324, and the single photon source 324 may be configured to produce pulses of single photons. In this example embodiment, the single photon source 324 performs substantially the same function as the combination of laser 304 and attenuator (or deflector) 306 of the embodiment shown in FIG. 3A. Accordingly, the combination of the laser 304 with the attenuator (or deflector) 306 may be replaced by a single photon source 324 and thus the single photon polarization state may be measured at the qubit decoder 326.

Having described specific components of example devices and circuitries involved in various embodiments contemplated herein, example procedures for session authentication are described below in connection with FIG. 4.

Example Operations for Passive Quantum Session Authentication

Figure 4:
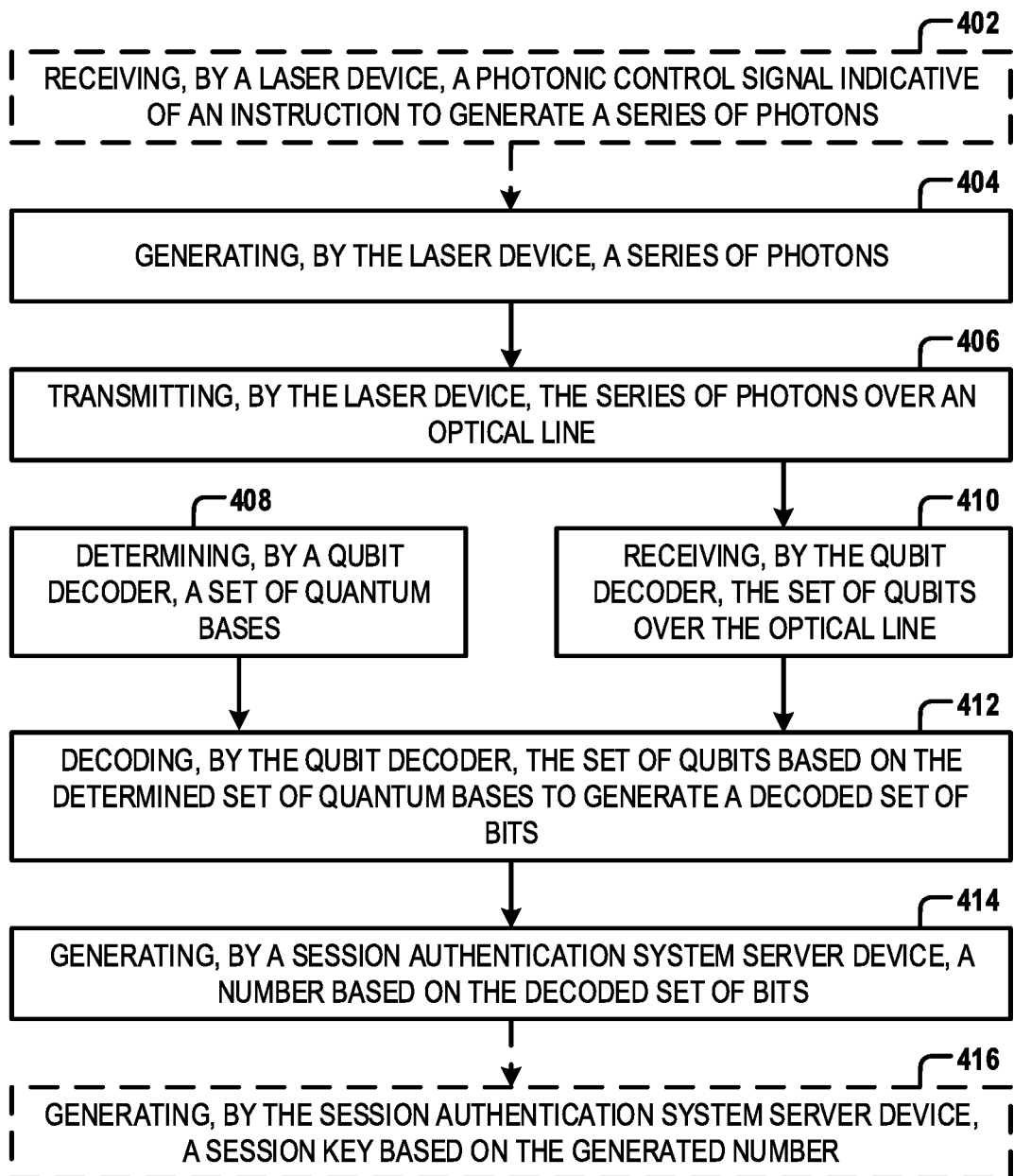
FIG. 4 illustrates an example flowchart for passive quantum session authentication in accordance with some example embodiments described herein.

Turning to FIG. 4, example flowchart 400 is illustrated that contains example operations for passive quantum session authentication according to example embodiments. The operations illustrated in FIG. 4 may, for example, be performed by one or more of the apparatuses shown in FIGS. 1A-1D, and described in FIGS. 2A-2F, such as: apparatus 200, which illustrates an example session authentication system 102 or, in some instances, an example session authentication system server device 104; apparatus 220, which illustrates an example client device 110; apparatus 240, which illustrates an example central management device 112; apparatus 260, which illustrates an example laser device 114; apparatus 270, which illustrates an example switching device 122; or apparatus 280, which illustrates an example qubit decoder 116. Although the following operations are described as being performed by one or another of apparatuses 200, 220, 240, 260, 270, or 280, it will be understood that this manner of description is for ease of explanation and should not be interpreted as meaning that others of apparatuses 200, 220, 240, 260, 270, or 280 cannot perform such operations (such as in embodiments in which, for instance, one or more of these apparatuses comprise components of another of these apparatuses). The various operations described in connection with FIG. 4 may be performed by one of apparatuses 200, 220, 240, 260, 270, or 280, and by or through the use of one or more corresponding processing circuitry 202, memory 204, input-output circuitry 206, classical communications circuitry 208, quantum basis determination circuitry 210, RNG circuitry 212, PRNG circuitry 214, session authentication circuitry 216, QKD circuitry 218, optical communications circuitry 222, photonic generation circuitry 224, decoding circuitry 226, sensor circuitry 228, switching circuitry 230, any other suitable circuitry, or any combination thereof.

Optionally, as shown by optional operation 402, a first apparatus (e.g., apparatus 260) comprising a laser device 114 includes means for receiving a photonic control signal indicative of an instruction to generate a series of photons. The means for generating the photonic control signal may be any suitable means, such as classical communications circuitry 208.

As shown by operation 404, the first apparatus (e.g., apparatus 260) comprising the laser device 114 includes means for generating a series of photons. The means for generating the series of photons may be any suitable means, such as photonic generation circuitry 224. It will be understood that although a laser device 114 generates a series of photons, other devices illustrated in the environments of FIGS. 1A-1D may perform preliminary operations facilitating performance of operation 404. In some embodiments, the photonic generation circuitry 224 may be configured to generate the series of photons in response to receipt of the photonic control signal at optional operation 402.

As shown by operation 406, the first apparatus (e.g., apparatus 260) comprising the laser device 114 includes means for transmitting the series of photons over an optical line (e.g., optical line 118, optical line 124) to a qubit decoder 116 or, in some instances, to a switching device 122. The means for transmitting the series of photons may be any suitable means, such as optical communications circuitry 222 described with reference to FIG. 2D. The optical line may be any suitable optical line, such as a non-polarization maintaining optical fiber.

As shown by operation 408, a second apparatus (e.g., apparatus 280) comprising a qubit decoder 116 includes means for determining a set of quantum bases. The means for determining the set of quantum bases may be any suitable means, such as quantum basis determination circuitry 210. In some embodiments, either the qubit decoder 116 itself, the central management device 112, or a session authentication system 102 (in embodiments where the central management device 112 is a component thereof) may invoke quantum basis determination circuitry 210 to determine set of quantum bases. In some embodiments, as noted previously, the quantum basis determination circuitry 210 may utilize a pseudo-random quantum basis selection technique for identifying one or more quantum bases to utilize in the determined set of quantum bases. Moreover, this pseudo-random quantum basis selection technique may identify not just a set of quantum bases to use, but may also identify one or another decoding schedule (e.g., a time-dependent decoding schedule or a unit-dependent decoding schedule, or another photon generation schedule altogether) governing when to use each quantum basis in the set of quantum bases for decoding of the series of photons.

As shown by operation 410, the second apparatus (e.g., apparatus 280) comprising the qubit decoder 116 includes means for receiving the series of photons over the optical line (e.g., optical line 118, optical line 124) from the laser device 114 or, in some instances, from the switching device 122. The means for receiving the series of photons may be any suitable means, such as optical communications circuitry 222.

As shown by operation 412, the second apparatus (e.g., apparatus 280) comprising the qubit decoder 116 includes means for decoding the series of photons based on the determined set of quantum bases to generate a decoded set of bits. The means for generating the decoded set of bits may be any suitable means, such as decoding circuitry 226 of apparatus 280, described with reference to FIG. 2F. In some embodiments, the decoding circuitry 226 may be configured to receive or retrieve the determined set of quantum bases based on a control signal.

As shown by operation 414, a third apparatus (e.g., apparatus 200) comprising a session authentication system server device 104 includes means for generating a number based on the decoded set of bits. The means for generating the number may be any suitable means, such as RNG circuitry 212 described with reference to FIG. 2A. For instance, the decoded set of bits may be the set of bits "10000010". In one example, the generated number may be the decoded set of bits "10000010". In another example, the generated number may be a number that includes the decoded set of bits in its entirety, such as "1000001000000000". It will be understood that in embodiments where the apparatus 200 comprises a distinct apparatus from apparatus 280, an intervening operation may take place in which the apparatus 280 comprises means, such as classical communications circuitry 208, for transmitting the decoded set of bits to the apparatus 200 (and the apparatus 200 includes corresponding classical communications circuitry 208 for receiving the decoded set of bits).

Optionally, as shown by optional operation 416, the third apparatus (e.g., apparatus 200) comprising a session authentication system server device 104 includes means for generating a session key based on the generated number. The means for generating the session key may be any suitable means, such as RNG circuitry 212, PRNG circuitry 214, session authentication circuitry 216, QKD circuitry 218, or a combination thereof. For example, the PRNG circuitry 214 may be configured to use the generated number as a seed for pseudo-random number generation, and to generate a pseudo-random number based on the seed, and then to transmit the pseudo-random number to the session authentication circuitry 216. The session authentication circuitry 216 may receive the pseudo-random number and generate the session key based on the pseudo-random number. In some instances, session authentication circuitry 216 may receive a number directly from RNG circuitry 212 and may generate the session key based directly on the generated number. In this regard, in some embodiments, the generated number may be the session key. In other instances, the pseudo-random number may be the session key. In still other instances, the session authentication circuitry 216 may perform a transformation on the pseudo-random number (e.g., convolution with another variable, such as time) to arrive at the session key. In some embodiments, the session authentication circuitry 216 may then transmit the generated session key to a client device 110 (e.g., via invoking QKD circuitry 218 to effect secure transmission of the session key), and may thereafter use the generated session key to authenticate a session between two devices, such as between the client device 110 and another device (e.g., a session authentication system server device 104 hosting a session accessed by the client device 110). Operation 818 is illustrated as optional insofar as the number generated in operation 816 may be used in theory for a variety of purposes, and not just within the context of session key generation.

It will be understood that although operations 414 and 416 are described above to illustrate practical applications of some example embodiments described herein, the number generated in operation 414 may in other embodiments be used for a variety of additional or alternative purposes (e.g., for gaming devices, statistics, cryptography, or the like) that may not necessarily fall within the context of session authentication.

In some embodiments, operations 402, 404, 406, 408, 410, 412, 414, and 416 may not necessarily occur in the order depicted in FIG. 4, and in some cases one or more of the operations depicted in FIG. 4 may occur substantially simultaneously, or additional steps may be involved before, after, or between any of the operations shown in FIG. 4.

As noted previously, there are many advantages of these and other embodiments described herein. In all cases, however, example embodiments of the present disclosure enhance the session authentication procedure by providing a session key that has truly random elements, which facilitate the generation of a session ID that cannot be reproduced by a third party.

FIG. 4 thus illustrates an example flowchart 400 describing the operation of various systems (e.g., session authentication system 102 described with reference to FIGS. 1A-1D), apparatuses (e.g., the apparatuses 200, 220, 240, 260, 270, and 280 described with reference to FIGS. 2A-2F), methods, and computer program products according to example embodiments contemplated herein. It will be understood that each operation of the flowchart, and combinations of operations in the flowchart, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200, 220, 240, 260, 270, or 280) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIG. 4 support combinations of means for performing the specified functions and combinations of operations for performing the specified functions. It will be understood that one or more operations of the flowchart, and combinations of operations in the flowchart, can be implemented by special purpose hardware-based computer systems which perform the specified functions, or combinations of special purpose hardware and computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for session authentication, the system comprising:
   decoding circuitry configured to:
      determine a set of quantum bases to use for measurement,
      receive a series of photons, and
      decode, based on the determined set of quantum bases, the series of photons to generate a decoded set of bits,
      wherein the decoding circuitry is configured to not transmit electronic information indicative of the set of quantum bases; and
   session authentication circuitry configured to:
      generate a session key based on the decoded set of bits.

2. The system of claim 1, wherein the decoding circuitry is configured to receive the series of photons while they are not in a well-defined quantum state.

3. The system of claim 1, wherein the series of photons comprise a series of non-polarized photons.

4. The system of claim 3, wherein a non-polarized photon comprises a photon whose polarization has not been measured.

5. The system of claim 1, wherein the decoding circuitry is configured to receive the series of photons over a non-polarization maintaining optical fiber.

6. The system of claim 1,
   wherein the decoding circuitry comprises a bit manipulator circuit,
   wherein the decoding circuitry is configured to decode the series of photons by measuring a polarization of the series of photons using the determined set of quantum bases, and
   wherein the bit manipulator circuit is configured to convert the measured polarization of the series of photons into the decoded set of bits.

7. The system of claim 1, further comprising:
   photonic generation circuitry configured to
      generate the series of photons, and
      transmit the series of photons to the decoding circuitry.

8. The system of claim 7, wherein the photonic generation circuitry comprises:
a laser configured to generate light; and
an attenuator or deflector, wherein the attenuator or deflector is configured to transform the generated light into the series of photons.

9. The system of claim 7, wherein the photonic generation circuitry comprises:
a single photon source configured to generate the series of photons.

10. The system of claim 7, wherein the photonic generation circuitry comprises:
a modulating circuit configured to generate the series of photons.

11. The system of claim 1, wherein the set of quantum bases comprises a time-dependent decoding schedule comprising a plurality of quantum bases respectively corresponding to a plurality of time periods, wherein the set of quantum bases comprises the plurality of quantum bases.

12. The system of claim 1, wherein the set of quantum bases comprises a unit-dependent decoding schedule comprising a plurality of quantum bases respectively corresponding to a plurality of numbers of bits, wherein the set of quantum bases comprises the plurality of quantum bases.

13. The system of claim 1, wherein the set of quantum bases comprises a pair of orthogonal photonic polarization states.

14. The system of claim 13, wherein the pair of orthogonal photonic polarization states are selected at least partially from the group consisting of a pair of rectilinear photonic polarization states, a pair of diagonal photonic polarization states, and a pair of circular photonic polarization states.

15. The system of claim 1, wherein the decoding circuitry is further configured to:
receive a control signal indicative of an instruction to initiate decoding based on the set of quantum bases; and
in response to receiving the control signal, decode the series of photons based on the set of quantum bases.

16. The system of claim 1, wherein a qubit decoder comprises the decoding circuitry, and wherein a separate session authentication system server device comprises the session authentication circuitry.

17. The system of claim 1, further comprising:
random number generation circuitry configured to generate a number based on the decoded set of bits,
wherein the session authentication circuitry is configured to generate the session key by
setting the session key equal to the generated number, or
using the generated number as a seed in a pseudo-random number generation procedure, wherein an output of the pseudo-random number generation procedure comprises the session key.

18. A method for session authentication, the method comprising:
determining, by decoding circuitry, a set of quantum bases to use for measurement;
receiving, by the decoding circuitry, a series of photons;
decoding, by the decoding circuitry and based on the determined set of quantum bases, the series of photons to generate a decoded set of bits,
wherein the decoding circuitry is configured to not transmit electronic information indicative of the set of quantum bases; and
generating, by session authentication circuitry, a session key based on the decoded set of bits.

19. A computer program product for session authentication, the computer program product comprising at least one non-transitory computer-readable storage medium storing program instructions that, when executed, cause an apparatus to:
determine a set of quantum bases to use for measurement;
receive a series of photons;
decode, based on the determined set of quantum bases, the series of photons to generate a decoded set of bits,
wherein the decoding circuitry is configured to not transmit electronic information indicative of the set of quantum bases; and
generate a session key based on the decoded.

* * * * *